US012645368B2

(12) United States Patent
Nguyen et al.

(10) Patent No.: US 12,645,368 B2
(45) Date of Patent: Jun. 2, 2026

(54) HOTNESS TRACKING

(71) Applicant: Samsung Electronics Co., Ltd.,
Suwon-si (KR)

(72) Inventors: Marie Mai Nguyen, Pittsburgh, PA
(US); Rekha Pitchumani, Oak Hill, VA
(US); Yang Seok Ki, Palo Alto, CA
(US); Jason Martineau, San Jose, CA
(US)

(73) Assignee: SAMSUNG ELECTRONICS CO.,
LTD. (KR)

( * ) Notice: Subject to any disclaimer, the term of this
patent is extended or adjusted under 35
U.S.C. 154(b) by 0 days.

(21) Appl. No.: 18/765,206

(22) Filed: Jul. 5, 2024

(65) Prior Publication Data

US 2025/0315164 A1 Oct. 9, 2025

Related U.S. Application Data

(60) Provisional application No. 63/631,975, filed on Apr.
9, 2024.

(51) Int. Cl.
G06F 3/06 (2006.01)
(52) U.S. Cl.
CPC .......... G06F 3/0617 (2013.01); G06F 3/0653
(2013.01); G06F 3/0685 (2013.01)
(58) Field of Classification Search
CPC ...... G05B 13/00–048; G05B 15/00–02; G05B
17/00–02; G06F 1/00–3296; G06F 3/00;
G06F 3/06–0689; G06F 5/00–16; G06F
8/00–78; G06F 9/00–548; G06F
11/00–3696; G06F 12/00–16; G06F 13/00–4295; G06F 15/00–825; G06F
16/00–986; G06F 18/00–41; G06F
17/00–40; G06F 21/00–88; G06F
2009/3883; G06F 2009/45562–45595;
G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24;
(Continued)

(56) References Cited

U.S. PATENT DOCUMENTS 8,775,731 B2 7/2014 McHale et al.
9,471,506 B2 10/2016 Benhase et al.
(Continued)

*Primary Examiner* — Daniel C. Chappell
(74) *Attorney, Agent, or Firm* — Renaissance IP Law
Group LLP

(57) ABSTRACT

A storage device is disclosed. A storage medium may store
a data, the data including a first portion and a second portion.
A cache may store the first portion of the data in a first cache
block. A controller may access the data from the storage
medium or the cache. A hotness tracker may track a first
temperature of the first portion of the data and a second
temperature of the second portion of the data. The hotness
tracker may to compute a third temperature of the data based
at least in part on the first temperature of the first portion of
the data and the second temperature of the second portion of
the data.

22 Claims, 19 Drawing Sheets

(58) Field of Classification Search
 CPC ........... G11B 33/00–1493; G11C 11/00–5692;
 G11C 13/00–06; G11C 14/00–009; G11C
 15/00–06; G11C 16/00–3495; G11C
 17/00–18; G11C 2207/00–229; G11C
 2216/00–30; H01L 25/00–50; H01L
 2225/00–1094; H03M 7/00–707; H04L
 9/00–38; H04L 12/00–66; H04L
 41/00–5096; H04L 49/00–9094; H04L
 61/00–59; H04L 67/00–75
 See application file for complete search history.

(56)  References Cited

U.S. PATENT DOCUMENTS

| | | |
|---|---|---|
| 9,761,294 B1 * | 9/2017 | Healy ................. G11C 11/1653 |
| 10,379,774 B2 | 8/2019 | Jain et al. |
| 10,552,329 B2 | 2/2020 | Chen et al. |
| 10,656,832 B2 * | 5/2020 | Kwon ................... G06F 3/0679 |
| 2008/0104323 A1 | 5/2008 | Colglazier et al. |
| 2010/0235438 A1 * | 9/2010 | Narayanan ............ H04L 65/612 |
| | | 709/203 |
| 2012/0239862 A1 * | 9/2012 | Seo ........................ G06F 12/023 |
| | | 711/E12.008 |
| 2016/0132273 A1 * | 5/2016 | Benhase ............. G06F 12/0802 |
| | | 711/122 |
| 2022/0004495 A1 | 1/2022 | Natarajan et al. |
| 2022/0382478 A1 | 12/2022 | Park et al. |
| 2023/0017824 A1 | 1/2023 | Park et al. |

* cited by examiner

Page Size = $n$ * Cache Block Size $$\text{Page Temperature} = \sum \text{Cache Block Temperatures}$$

HOTNESS TRACKING

RELATED APPLICATION DATA

This application claims the benefit of U.S. Provisional Patent Application Ser. No. 63/631,975, filed Apr. 9, 2024, which is incorporated by reference herein for all purposes.

FIELD

The disclosure relates generally to storage, and more particularly to tracking hotness in storage devices.

BACKGROUND

Computer systems may include multiple tiers of storage. For example, a computer system may include a main memory and a storage device. Moving data between storage tiers may expedite access to data. But what data to move between storage tiers is an unsolved problem.

A need remains to determine what data to move between storage tiers.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
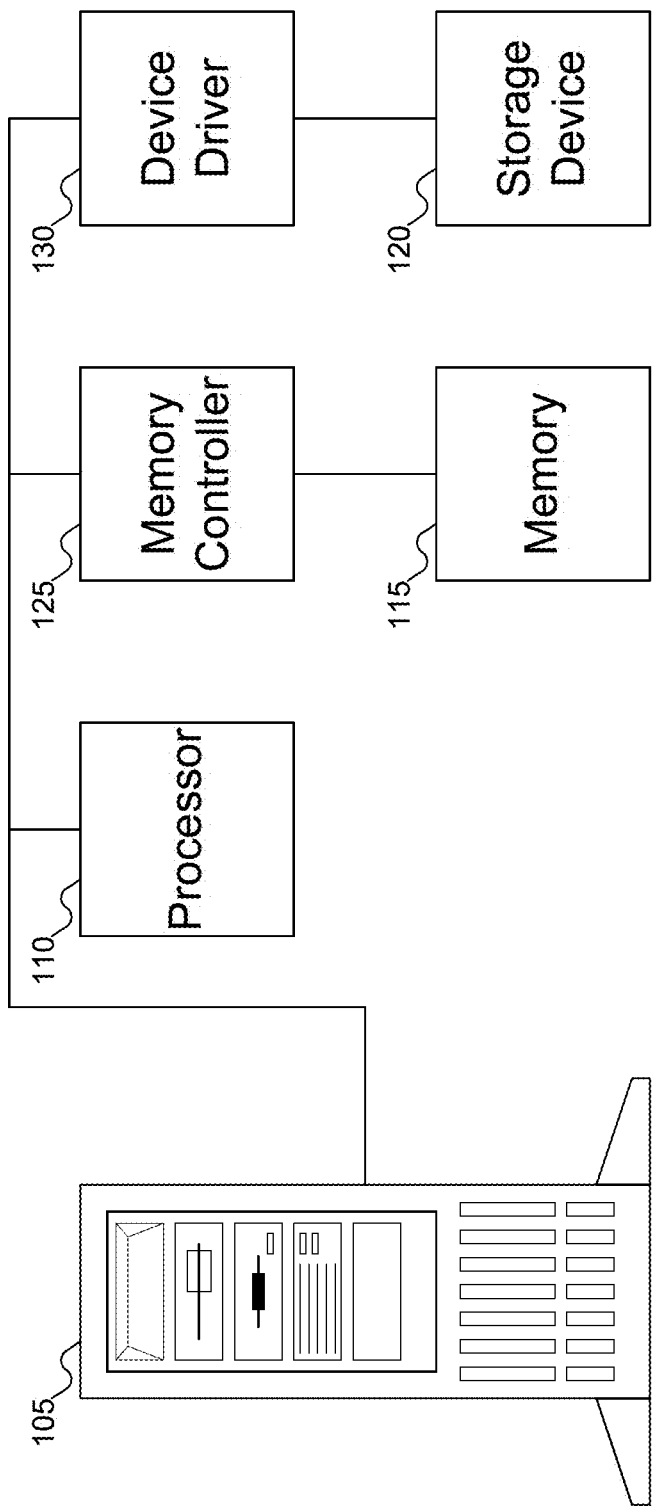
FIG. 1 shows a machine including a storage device that may perform hotness tracking, according to embodiments of the disclosure.

A hotness tracker may track the temperatures of cache block-sized data portions. The temperatures of the cache block-sized data portions may be used to determine a temperature for a page. The temperature for the page may then be used to determine whether to update a hot page list to include the page.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Computer systems may have multiple tiers of storage. The number of tiers continues to grow, with each tier offering varying benefits and costs. For example, originally, computer systems would include a main memory and a tape drive, a floppy disk drive, or a hard disk drive. More recently, Solid State Drives (SSDs) have entered the picture. Storage devices supporting a cache-coherent interconnect protocol, such as the Compute Express Link® (CXL®) protocol, may support accessing the storage device as though it was an extension of main memory rather than accessing data through file system protocols, which may provide faster access than an SSD. (Compute Express Link and CXL are registered trademarks of the Compute Express Link Consortium, Inc. in the United States.) In general, there is an inverse relationship between speed of a storage tier and its cost per unit of storage: the faster the storage tier, the greater the cost per unit of storage.

As the number of storage tiers continues to grow, managing the movement of data between the tiers becomes an important consideration. One approach that may be used to determine what data should be stored in what storage tier is the "temperature" of the data: in general, the "hotter" the data (that is, the more often the data is accessed), the better it would be to keep that data in a faster storage tier. Thus, for example, it might be beneficial to store hot data in main memory rather than in, say, an SSD, whereas cold data might be better stored in an SSD than in, say, main memory.

A host processor might track the temperature of all data across all the storage tiers. But tracking data temperature across all the storage tiers might involve a lot of processing and a lot of storage for temperature information.

Embodiments of the disclosure address these concerns by enabling storage devices themselves to track the temperature of the data stored in their storage tier. Storage devices may track temperatures of just their own data, or may track temperatures of data across some or all storage devices in that storage tier. The storage device may then provide that information to the host processor on demand, so that the host processor may then determine whether data should be moved between or among the storage tiers, and what the optimal arrangement of the data should be across the storage tiers.

A storage device, such as an SSD, may include its own hotness tracker. The hotness tracker may be implemented as part of the controller of the storage device, or the hotness tracker may be implemented as a separate element. The hotness tracker may track how hot data is based on how often the data is accessed, and may report to the host processor what data is considered the hottest or coldest for migration to another storage tier.

FIG. 1 shows a machine including a storage device that may perform hotness tracking, according to embodiments of the disclosure. In FIG. 1, machine 105, which may also be termed a host or a system, may include processor 110, memory 115, and storage device 120.

Processor 110, which may also be referred to as a host processor, may be any variety of processor. (Processor 110, along with the other components discussed below, are shown outside the machine for ease of illustration: embodiments of the disclosure may include these components within the machine.) While FIG. 1 shows a single processor 110, machine 105 may include any number (one or more, without bound) of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115, which may also be referred to as a main memory, may be any variety of memory, such as flash memory, Dynamic Random Access Memory (DRAM), Static Random Access Memory (SRAM), Persistent Random Access Memory, Ferroelectric Random Access Memory (FRAM), or other Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Whereas memory 115 may be used to store data that is considered "short-term", storage device 120, which may also be termed a memory device, may be used to store data that is considered "long-term": that is, data that is expected to be retained for longer periods of time and that should be retained in a persistent manner, even if deliver of power to machine 105 should be interrupted. Storage device 120 may be accessed using device driver 130.

Storage device 120 may be associated with an accelerator. Such an accelerator may be used for, for example, near-data processing. That is, the accelerator may be used to process data closer to storage device 120, to reduce or eliminate transfer of data from storage device 120 into memory 115. The use of an accelerator for near-data processing may also offload processing from processor 110, as the accelerator may perform such processing instead of processor 110. Like processor 105, such an accelerator may implement a Reduced Instruction Set Computer (RISC) architecture or a Complex Instruction Set Computer (CISC) architecture (among other possibilities), and may be implemented using a Central Processing Unit (CPU), a Field Programmable Gate Array (FPGA), an Application-Specific Integrated Circuit (ASIC), A System-on-a-Chip (SoC), a Graphics Processing Unit (GPU), a General Purpose GPU (GPGPU), a Neural Processing Unit (NPU), or a Tensor Processing Unit (TPU).

The combination of storage device 120 and accelerator may also be referred to as a computational storage device, computational storage unit, computational storage device, or computational device. Storage device 120 and an accelerator may be designed and manufactured as a single integrated unit, or the accelerator may be separate from storage device 120. The phrase "associated with" is intended to cover both a single integrated unit including both a storage device and an accelerator and a storage device that is paired with an accelerator but that are not manufactured as a single integrated unit. In other words, a storage device and an accelerator may be said to be "paired" when they are physically separate devices but are connected in a manner that enables them to communicate with each other. Further, in the remainder of this document, any reference to storage device 120 may be understood to refer to both storage device 120 and the accelerator either as physically separate but paired (and therefore may include the other device) or to both devices integrated into a single component as a computational storage unit.

In addition, the connection between the storage device and the paired accelerator might enable the two devices to communicate, but might not enable one (or both) devices to work with a different partner: that is, the storage device might not be able to communicate with another accelerator, and/or the accelerator might not be able to communicate with another storage device. For example, the storage device and the paired accelerator might be connected serially (in either order) to the fabric, enabling the accelerator to access information from the storage device in a manner another accelerator might not be able to achieve.

While FIG. 1 uses the generic term "storage device", embodiments of the disclosure may include any storage device formats that may be associated with computational storage, examples of which may include hard disk drives and Solid State Drives (SSDs). Any reference to a specific type of storage device, such as an "SSD", below should be understood to include such other embodiments of the disclosure.

Processor 105 and storage device 120 may communicate across a fabric (not shown in FIG. 1). This fabric may be any fabric along which information may be passed. Such fabrics may include fabrics that may be internal to machine 105, and which may use interfaces such as Peripheral Component Interconnect Express (PCIe), Serial AT Attachment (SATA), or Small Computer Systems Interface (SCSI), among others. Such fabrics may also include fabrics that may be external to machine 105, and which may use interfaces such as Ethernet, Infiniband, or Fibre Channel, among others. In addition, such fabrics may support one or more protocols, such as Non-Volatile Memory Express (NVMe), NVMe over Fabrics (NVMe-oF), Simple Service Discovery Protocol (SSDP), or a cache-coherent interconnect protocol, such as the Compute Express Link® (CXL®) protocol, among others. (Compute Express Link and CXL are registered trademarks of the Compute Express Link Consortium in the United States.) Thus, such fabrics may be thought of as encompassing both internal and external networking connections, over which commands may be sent, either directly or indirectly, to storage device 120. In embodiments of the disclosure where such fabrics support external networking connections, storage device 120 might be located external to machine 105, and storage device 120 might receive requests from a processor remote from machine 105.

Figure 2:
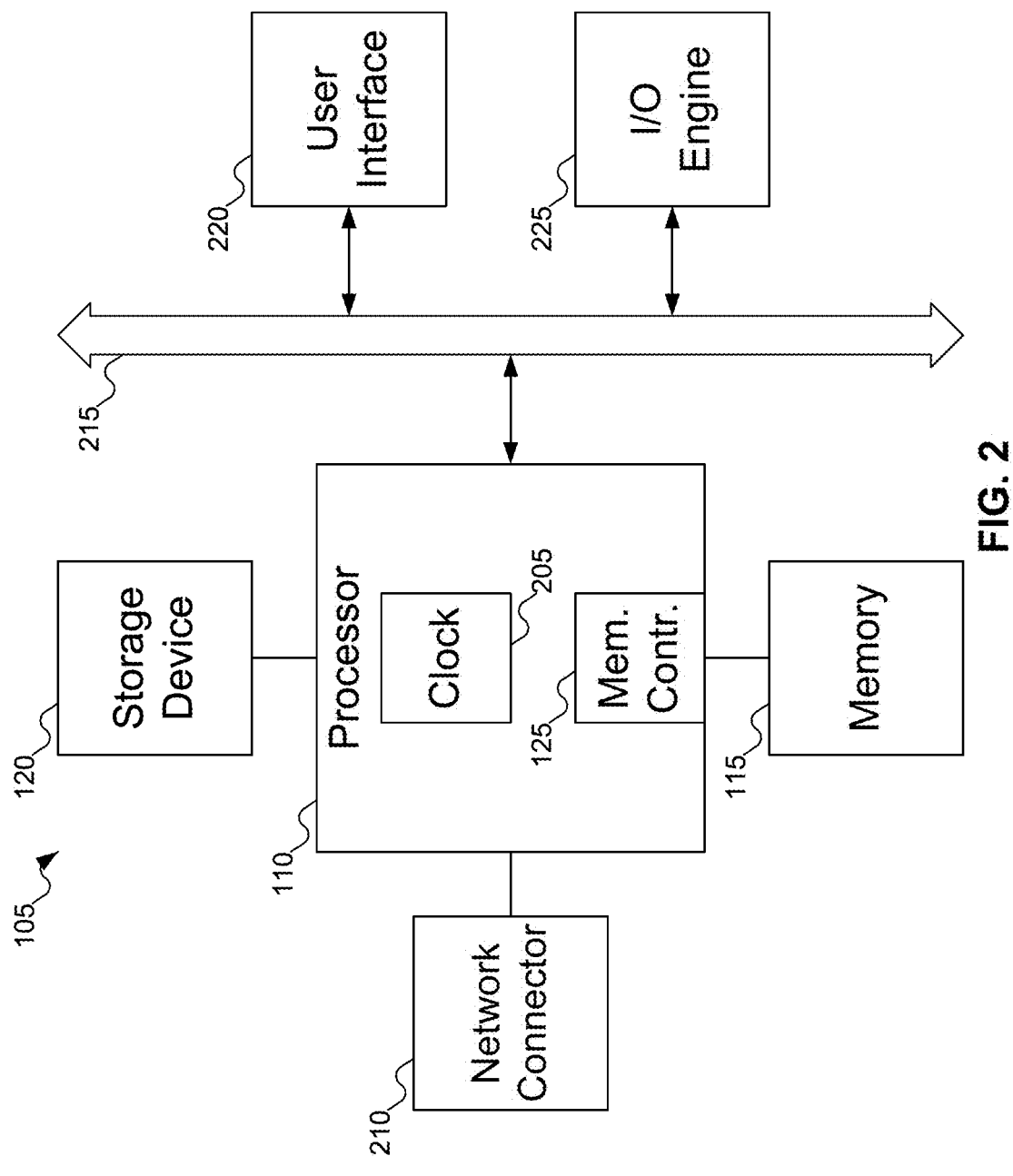
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
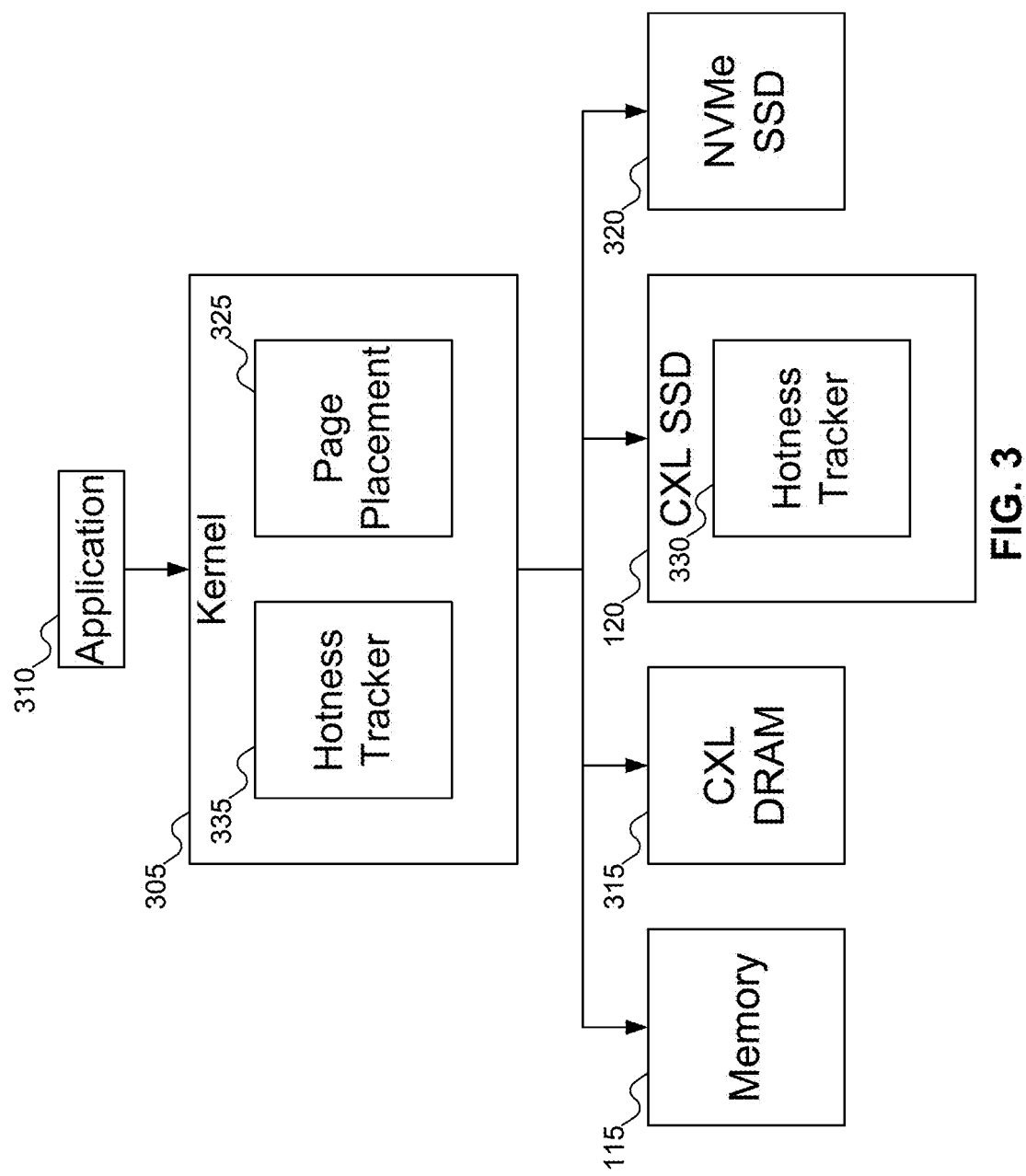
FIG. 3 shows a role the storage device of FIG. 1 may play in the machine of FIG. 1 according to embodiments of the disclosure.

FIG. 3 shows a role storage device 120 of FIG. 1 may play in the machine of FIG. 1. In FIG. 3, kernel 305 may be part of the operating system running on processor 110 of FIG. 1. In addition, application 310 may also be running on the operating system. Application 310 may issue requests to access data: such requests may be sent to kernel 305.

The data being requested by application 310 may be stored on any of a number of storage elements. These storage elements may include, for example, memory 115 (which may be, for example, DRAM), CXL DRAM 315, CXL SSD 120, and/or NVMe SSD 320. While FIG. 3 shows the memory tiers as including CXL DRAM 315 and CXL SSD 120, embodiments of the disclosure may include any other desired types of storage, with CXL-type devices shown solely as an example. For example, CXL DRAM 315 and CXL SSD 120 might be replaced with other types of memory devices, such as other cache-coherent interconnect protocol devices. Data may be stored on any of these storage elements, and may be moved (or copied, as appropriate to the type of data) among the storage elements. Kernel 305 may include page placement module 325, which may select memory tiers for different pieces of data: each data might be stored in a different memory tier. In addition, while FIG. 3 shows four memory tiers, embodiments of the disclosure may include any number (two or more, without bound, as there is no concern about moving data between memory tiers if there is only one memory tier) of memory tiers.

In particular, CXL SSD 120 is shown as including hotness tracker 330. Hotness tracker 330 may track the temperature of data stored on CXL SSD 120, and may provide information about what pages are hot (or not), so that page placement module 325 of kernel 305 may decide whether to move (or copy) data between the memory tiers, and if so to which data should be moved (or copied). (Whether data is moved or copied may depend on the memory tiers involved and the persistence of the data. For example, data that does not need to be persisted may be moved between memory tiers, even if the data is moved from a memory tier including a non-volatile storage, such as CXL SSD 120 or NVMe SSD 320. On the other hand, data that should be persisted, if it is currently stored on CXL SSD 120 or NVMe SSD 320, may be copied into another memory tier, so that the data may continue to persist in the non-volatile storage of the original memory tier.) It may be noted that kernel 305 is also shown as including its own hotness tracker 335.

Kernel 305 may use hotness tracker 335 to track the temperature of data on the various memory tiers. But tracking data hotness may require some processing capabilities, which may reduce the availability of processor 110 of FIG. 1 for other tasks when data hotness is being tracked. By including hotness tracker 330 in CXL SSD 120, the burden on kernel 305 may be reduced. Note that even if CXL SSD

120 tracks its own data temperature using hotness tracker 330, kernel 305 might still need hotness tracker 335 to track the temperature of data in devices that do not include their own hotness trackers. For example, if memory 115 or NVMe SSD 320 do not include their own hotness trackers, then hotness tracker 335 may track data hotness in those devices. But if all the memory tiers in a particular machine 105 of FIG. 1 are configured to track their own data hotness, then hotness tracker 335 may be omitted.

Figure 4:
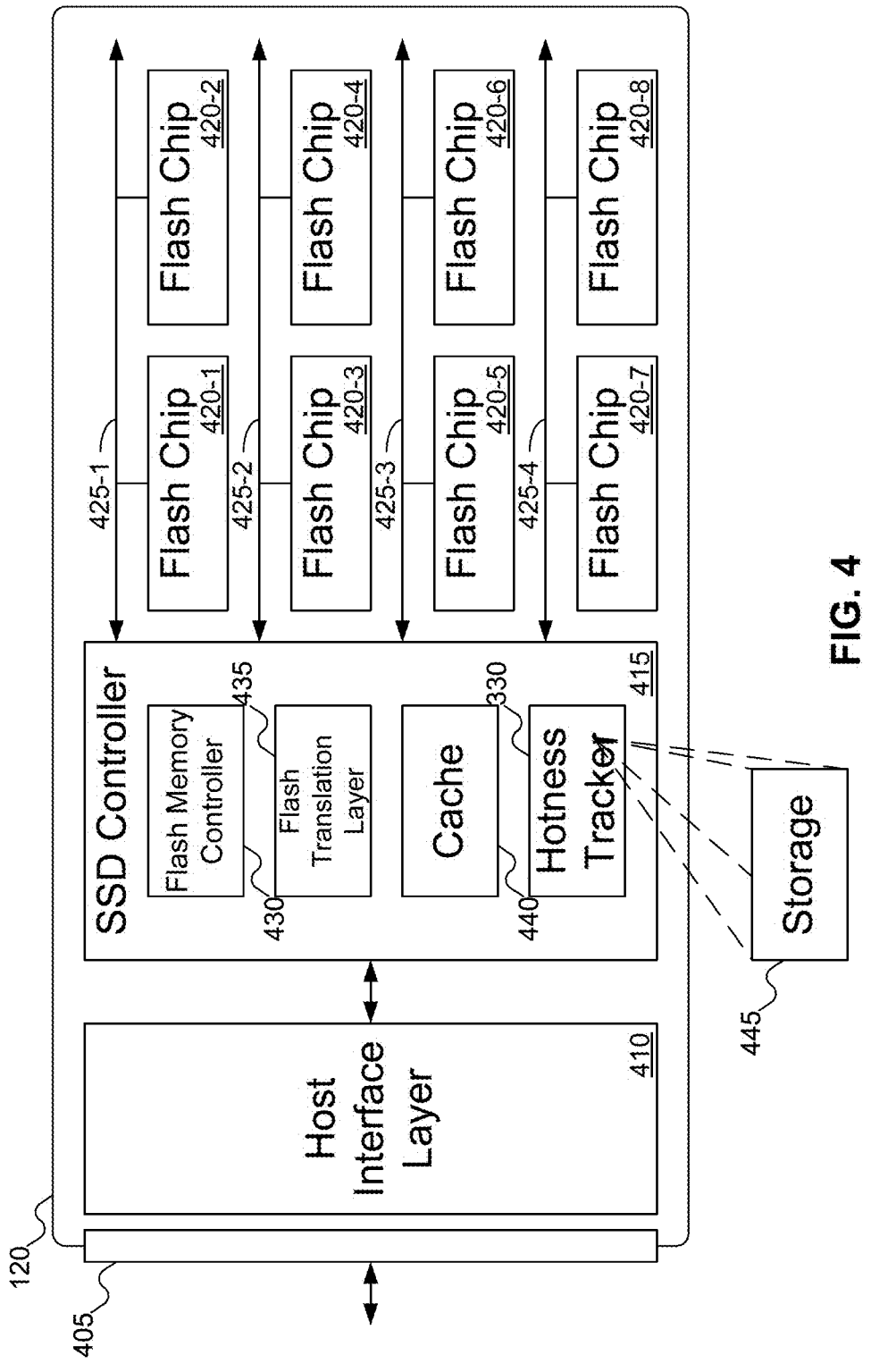
FIG. 4 shows details of the storage device of FIG. 1, according to embodiments of the disclosure.

FIG. 4 shows details of storage device 120 of FIG. 1, according to embodiments of the disclosure. In FIG. 4, storage device 120 is shown using an implementation including SSD 120, but embodiments of the disclosure are applicable to any type of storage device that may support caching of data, as discussed below.

SSD 120 may include interface 405 and host interface layer 410. Interface 405 may be an interface used to connect SSD 120 to machine 105 of FIG. 1. Examples of such interfaces may include Serial AT Attachment (SATA), mSATA, Serial Attached Small Computer Systems Interface (SCSI) (SAS), NVMe, PCIe, U.2, M.2, and Enterprise and Datacenter Standard Form Factor (EDSFF): other interfaces are also possible. SSD 120 may include more than one interface 405: for example, one interface might be used for block-based read and write requests, and another interface might be used for key-value read and write requests. While FIG. 4 suggests that interface 405 is a physical connection between SSD 120 and machine 105 of FIG. 1, interface 405 may also represent protocol differences that may be used across a common physical interface. For example, SSD 120 might be connected to machine 105 using a U.2, EDSFF, or an M.2 connector, among other possibilities, and SSD 120 may support block-based requests and key-value requests: handling the different types of requests may be performed by a different interface 405. SSD 120 may also include a single interface 405 that may include multiple ports, each of which may be treated as a separate interface 405, or just a single interface 405 with a single port, and leave the interpretation of the information received over interface 405 to another element, such as SSD controller 415.

Host interface layer 410 may manage interface 405, providing an interface between SSD controller 415 and the external connections to SSD 120. If SSD 120 includes more than one interface 405, a single host interface layer 410 may manage all interfaces, SSD 120 may include a host interface layer 410 for each interface, or some combination thereof may be used.

SSD 120 may also include SSD controller 415 and various flash memory chips 420-1 through 420-8, which may be organized along channels 425-1 through 425-4. Flash memory chips 420-1 through 420-8 may be referred to collectively as flash memory chips 420, and may also be referred to as flash chips, memory chips, NAND chips, chips, or dies. Channels 425-1 through 425-4 may be referred to collectively as channels 425.

SSD controller 415 may manage sending read requests and write requests to flash memory chips 420 along channels 425. Controller 415 may also include flash memory controller 430, which may be responsible for issuing commands to flash memory chips 420 along channels 425. Flash memory controller 430 may also be referred to more generally as memory controller 430 in embodiments of the disclosure where storage device 120 stores data using a technology other than flash memory chips 420. Although FIG. 4 shows eight flash memory chips 420 and four channels 425, embodiments of the disclosure may include any number (one or more, without bound) of channels 425 including any number (one or more, without bound) of flash memory chips 420.

Within each flash memory chip or die, the space may be organized into planes. These planes may include multiple erase blocks (which may also be referred to as blocks), which may be further subdivided into wordlines. The wordlines may include one or more pages. For example, a wordline for Triple Level Cell (TLC) flash media might include three pages, whereas a wordline for Multi-Level Cell (MLC) flash media might include two pages. In some embodiments of the disclosure, the page may be the smallest unit of data that may be written to or read from SSD 120; in other embodiments of the disclosure, the smallest unit of data that may be written to or read from SSD 120 may differ from the size of a page.

Erase blocks may also be logically grouped together by controller 415, which may be referred to as a superblock. This logical grouping may enable controller 415 to manage the group as one, rather than managing each block separately. For example, a superblock might include one or more erase blocks from each plane from each die in storage device 120. So, for example, if storage device 120 includes eight channels, two dies per channel, and four planes per die, a superblock might include 8×2×4=64 erase blocks.

SSD controller 415 may also include flash translation layer (FTL) 435 (which may be termed more generally a translation layer, for storage devices that do not use flash storage). FTL 435 may handle translation of logical block addresses (LBAs) or other logical IDs (as used by processor 110 of FIG. 1) and physical block addresses (PBAs) or other physical addresses where data is stored in flash chips 420. FTL 435, may also be responsible for tracking data as it is relocated from one PBA to another, as may occur when performing garbage collection and/or wear leveling.

SSD controller 415 may also include cache 440. Cache 440 may be used to store data written to or read from flash memory chips 420. Cache 440 may be implemented using, for example, DRAM or SRAM memories, among other possibilities, and may include its own cache controller, which may be responsible for tracking what data is stored in which cache blocks and what cache blocks should be subject to eviction to make room for new data (when necessary). As data is written to or read from flash memory chips 420, cache 440 may be used to store the data, to expedite returning a result to processor 110 of FIG. 1 that the operation has been completed and/or to return data faster from SSD 120 if requested again in the future.

Because cache 440 may be small relative to the overall storage available in flash memory chips 420, cache 440 might not have enough room for all data written to or read from SSD 120 by processor 110. Thus, eventually, cache 440 may need to evict data to make room for new data. Cache 440 may use any desired policy for selecting data for eviction, including, for example, least recently used (LRU), least frequently used (LFU), and first in, first out (FIFO), among other possibilities.

Finally, SSD controller 415 may include hotness tracker 330. Hotness tracker 330 may function as described above and below, tracking the temperature of data stored on SSD 120 and providing that information to kernel 305 when needed (or when requested). Hotness tracker 330 may include its own storage 445, which may be used to store, for example, temperature information for the data stored on SSD 120 and what pages are considered hottest (or coldest). Storage 445 may be implemented using any desired technology, including, for example, DRAM or SRAM memories. In addition, while FIG. 4 shows hotness tracker 330 as including only one storage 445, embodiments of the disclosure may have hotness tracker 330 including multiple storage 445: for example, one storage 445 for temperature information about data stored on SSD 120, and another storage 445 for the list of hottest (or coldest) pages. Storage 445 may also be omitted, and the data that might be stored therein may be stored instead in flash memory chips 420 (using a portion of the capacity of SSD 120).

While FIG. 4 shows SSD controller 415 as including flash memory controller 430, flash translation layer 435, cache 440, and hotness tracker 330, embodiments of the disclosure may have any, some, or all of these elements located outside SSD controller 415, without loss of generality.

Figure 5:
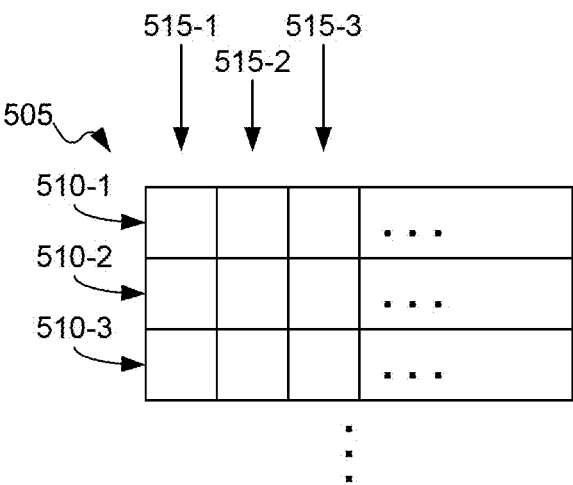
FIG. 5 shows details about the data that may be stored in the storage device of FIG. 1, according to embodiments of the disclosure.

FIG. 5 shows details about the data that may be stored in storage device 120 of FIG. 1, according to embodiments of the disclosure. As discussed above, SSD 120 of FIG. 1 may organize data into erase blocks, which may be divided into wordlines and then into pages. Further, as discussed above, in some embodiments of the disclosure, the page may be the smallest unit of data that may be written to SSD 120 or read from SSD 120 of FIG. 1 by processor 110 of FIG. 1. Thus, page placement module 325 of FIG. 3 may move data into (or out of) SSD 120 in units of pages, which may correspond to the size of pages used by the other memory tiers (such as memory 115 of FIG. 1). As an example, a page might be approximately 4 kilobytes (KB) in size, although embodiments of the disclosure may support other page sizes as well.

But the page might not be the smallest unit of data that may be managed within SSD 120. For example, a page might be divided into cache blocks, each of which may be stored independently in cache 440 of FIG. 4. This fact means that a page might include more than one cache block. For example, if the page is 4 KB in size and each cache block is 1 KB in size, then the page may include four cache blocks, each of which may be stored separately in cache 440 of FIG. 4.

As shown in FIG. 5, data 505 may consist of multiple pages 510-1, 510-2, and 510-3 (which may be referred to collectively as pages 510). Each page 510 may be divided into portions 515-1, 515-2, and 515-3, each of which may be sized to fit in a cache block in cache 440 of FIG. 4. For example, as described above, each page 510 might be 4 KB in size, and each portion 515 might be 1 KB in size. Thus, while page 510 may be the unit of data moved (or copied) between the memory tiers, portions 515 may be the unit of data cached in cache 440 of FIG. 4.

While FIG. 5 shows three pages 510 and three portions 515 per page 510, embodiments of the disclosure may include any number (one or more, without bound) of pages 510, and any number (one or more, without bound) of portions 515 per page 510. In addition, while some embodiments of the disclosure may have the same number of portions 515 per page 510, other embodiments of the disclosure might divide pages 510 into different numbers of portions 515.

Figure 6:
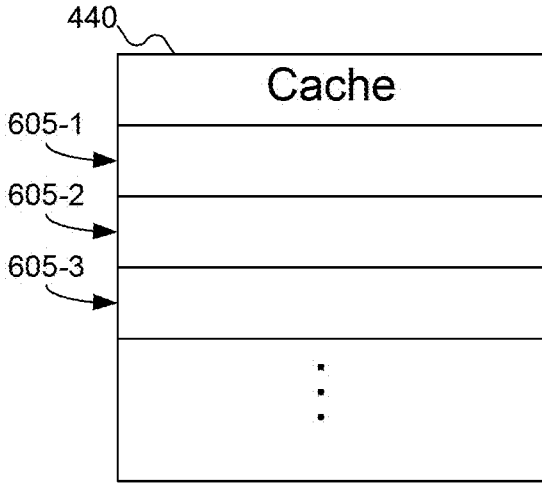
FIG. 6 shows details of the cache of FIG. 4, according to embodiments of the disclosure.

FIG. 6 shows details of cache 440 of FIG. 4, according to embodiments of the disclosure. In FIG. 6, cache 440 is shown in detail. Cache 440 is shown as including cache blocks 605-1, 605-2, and 605-3, which may be referred to collectively as cache blocks 605. Cache blocks 605 may be of equal size, or they may be of varying sizes. Each cache block 605 may store any of portions 515 of FIG. 5.

Note that storing one portion 515 of FIG. 5 in cache blocks 605 does not mean that the entirety of the page 510 of FIG. 5 including that portion 515 of FIG. 5 is necessarily stored in cache 440. That is, each portion 515 of FIG. 5 may be stored or not in any of cache blocks 605. Thus, it might be that all, some, or none of portions 515 of FIG. 5 of the page 510 of FIG. 5 are stored in cache 440. Nor is there necessarily any relationship between the relative order of positions 515 of FIG. 5 and in which cache blocks 605 those portions 515 of FIG. 5 might be stored. For example, portions 515-1 and 515-3 of FIG. 5 of page 510 of FIG. 5 might be stored in cache blocks 605-2 and 605-1, respectively, but portion 515-2 of FIG. 5 of page 510 of FIG. 5 might not be stored in cache 440. Portions 515-1 and 515-3 of FIG. 5 of page 510 of FIG. 5 might also be stored in any other cache blocks 605, without regard to their relative order or the "distance" between them (in terms of the number of cache blocks 605 separating them).

While FIG. 6 shows cache 440 as including three cache blocks 605, embodiments of the disclosure may include any number (one or more, without bound) of cache blocks 605. The more cache blocks 605 are included in cache 440, the more data may be cached, but requiring additional storage capacity in cache 440. Thus, the size of cache 440 may balance the competing objectives of speed of data operations in storage device 120 of FIG. 1 and cost to manufacture storage device 120 of FIG. 1.

Figure 7:
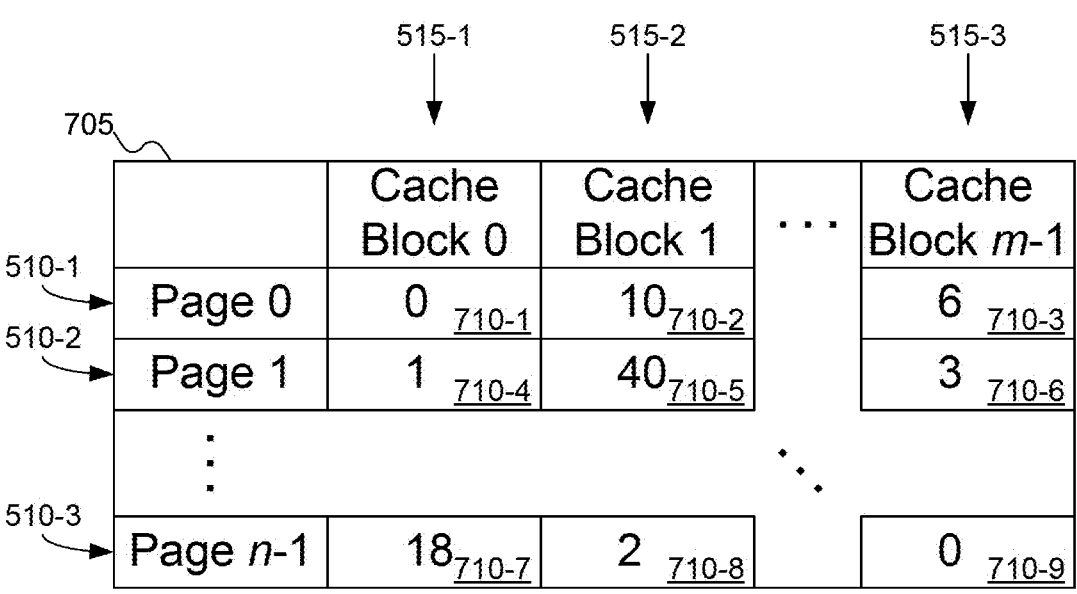
FIG. 7 shows details of tracking the temperature of portions of data pages in the hotness tracker of FIG. 3, according to embodiments of the disclosure.

FIG. 7 shows details of tracking the temperature of portions of data pages in hotness tracker 330 of FIG. 3, according to embodiments of the disclosure. In FIG. 7, table 705 is shown. Table 705 may store information about the temperature of each portion 515 of each page 510 stored on storage device 120 of FIG. 1. The temperature of each portion 515 may be determined using any desired approach: in the example shown in FIG. 7, temperature is determined by access requests, which may include requests to read or to write the data. That is, each time portion 515 is accessed (typically by processor 110 of FIG. 1 or application 310 of FIG. 3, but access requests might also originate from other locations, such as an accelerator or a computational storage unit), that access request may increase a counter that reflects the temperature of portion 515. Thus, for example, in table 705, temperature 710-1 reflects that portion 515-1 of page 510-1 has yet to be accessed, temperature 710-2 reflects that portion 515-2 of page 510-1 has been accessed 10 times, and so on for the temperatures 710-3 through 710-9. (Temperatures 710-1 through 710-9 may be referred to collectively as temperatures 710.)

Given the number of portions 515 per page 510 and the number of pages 510, it may be concluded that the number of temperatures 710 in table 705 may calculated as the product of the number of portions 515 per page 510 and the number of pages 510. For example, if storage device 120 is a 1 terabyte (TB) storage device with a page size of 4 KB, then storage device 120 may include a total of 268,435,456 pages. If the cache block size is 1 KB, there are four cache blocks per page and a total of 1,073,741,824 cache blocks in storage device 120. If temperatures 710 are each one byte in size, then the storage needed for table 705 is approximately 1 gigabyte (GB). Increasing or decreasing the capacity of storage device 120, or changing the sizes (and therefore the numbers) of pages 510 and/or cache blocks 605 of FIG. 6, may result in adjustments to the size of table 705. For example, if the cache block size is increased to 4 KB, then the size of table 705 may be reduced to approximately 268 megabytes (MB) (presumably, the size of pages 510 would also increase, or otherwise there would be only one portion 515 per page 510). Table 705 may be stored in, for example, storage 445 of FIG. 4.

But note that using one byte (or any other fixed size) counters for temperatures 710 might result in overflow if temperatures 710 are not reset periodically. To support resetting temperatures, epochs may be defined. An epoch may be an interval of time: for example, 1 microsecond. As a new epoch begins, temperatures 710 may be reset to avoid counter overflow. Alternatively, processor 110 of FIG. 1 may send a request to storage device 120 of FIG. 1, requesting that storage device 120 of FIG. 1 reset temperatures 710.

Embodiments of the disclosure may also include variations on tracking temperatures 710 other than just counting the number of accesses of portions 515 of FIG. 5. For example, consider the situation where there are a large number of accesses to a particular page 510 of FIG. 5, but such accesses occur around the time that an epoch ends (and counters 515 of FIG. 5 and temperatures 715 are reset). It might occur that there are enough accesses across the epoch boundary that page 510 of FIG. 5 would be considered sufficiently hot to warrant being considered for migration into another storage tier; but within each epoch individually, the number of accesses might not be sufficient to warrant such consideration.

Figure 8:
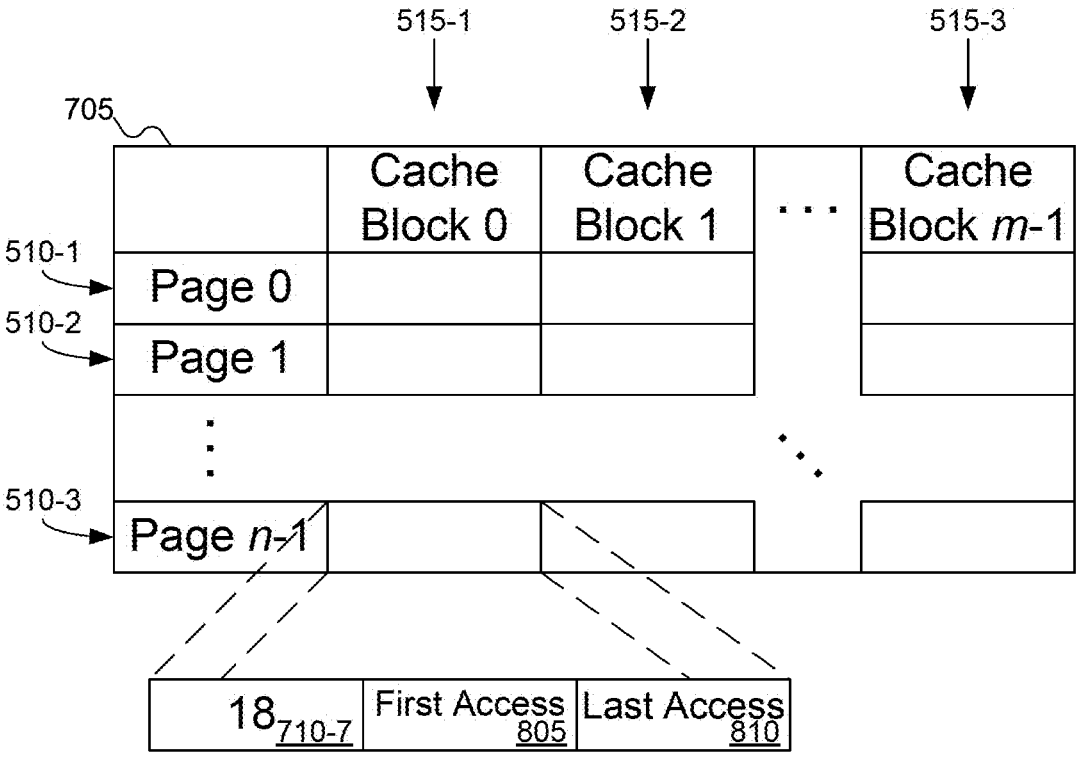
FIG. 8 shows details of a second mechanism to track the temperature of portions of data pages in the hotness tracker of FIG. 3, according to embodiments of the disclosure.

To address such concerns, table 705 may be modified to store additional data. FIG. 8 shows details of a second mechanism to track the temperature of portions of data pages in the hotness tracker of FIG. 3, according to embodiments of the disclosure. In FIG. 8, each entry in table 705 may be modified to store three pieces of data: temperature 710 for that portion 515 in that page 510, a start time, and an end time. For example, the information stored for portion 515-1 in page 510-3 is shown enlarged, and may include temperature 710-7 (the same as in FIG. 7), first access time 805, and last access time 810. The other entries in table 705 may similarly be modified.

First access time 805 and last access time 810 may reflect when accesses to portion 515-1 in page 510-3 started and ended, respectively. That is, first access time 805 may represent the first access to portion 515-1 in page 510-3, and last access time 810 may represent the last access to portion 515-1 in page 510-3. Given the delta between first access time 805 and last access time 810, a time interval may be determined, and using that delta and temperature 710-7, a rate of access to the data in portion 515-1 in page 510-3 may be determined (a ratio of temperature 710-7 to the delta between first access time 805 and last access time 810). As an equation, the rate of access may be calculated as $$Rate = \frac{Count}{(End\ time - Start\ time)}.$$

Then, instead of using just count 710-7 to represent the temperature, this rate of access may be used to represent the temperature for portion 515-1 in page 510-3.

When data is first accessed from portion 515-1 in page 510-3, first access time 805 and last access time 810 may each be set to the time at which the access request is received. Thereafter, last access time 810 may be updated to the time at which later access requests are received. At some point, temperature 710-7, first access time 805, and last access time 810 may all be reset: for example, when the current time is some threshold amount of time later than last access time 810 (that is, when a threshold amount of time has passed since the last time portion 515-1 in page 510-3 was accessed), so that any subsequent request to access data from portion 515-1 in page 510-3 may be considered the first time (again) that the data in portion 515-1 in page 510-3 is accessed. Other portions 515 in pages 510 may also be similarly tracked.

In yet other embodiments of the disclosure, each entry in table 705 may track temperature 710 and last access time 810, but may omit start time 810. Last access time 810 may still be used to store the last time the data in portion 515 of page 510 was accessed. Last access time 810 may then be used as a mechanism to determine whether portion 515 of page 510 has been heating up or cooling off. That is, last access time 810 may be compared with the current time. If last access time 810 is within some threshold delta from the current time, that fact may represent that processor 110 of FIG. 1 may still be accessing data from portion 515 of page 510: that is, that data from portion 515 of page 510 still appears to be of interest, and therefore may be considered "hot". On the other hand, if last access time 810 is beyond the threshold from the current time, then portion 515 of page 510 may be of lower interest, and therefore may be considered "cooler". Of course, embodiments of the disclosure may factor in both how long it has been since the last access to portion 515 of page 510 and how many times portion 515 of page 510 has been accessed since temperature 710 was last reset. That way, portion 515 of page 510 was accessed sufficiently frequently, portion 515 of page 510 may still be considered relatively "hot" even if it has been a relatively longer amount of time since portion 515 of page 510 was accessed. And, as discussed above, if the delta between last access time 810 and the current time is sufficiently large (potentially another threshold), then the information in the entry in table 705 may be reset, as the data in portion 515 of page 510 no longer appears to be important.

To determine which portions 515 are considered hot enough to warrant caching, portions 515 with the highest access rate may be considered for caching. To determine which pages 510 are considered hot enough to possibly migrate to another storage tier, the sum or arithmetic mean of the access rates for each portion 515 in pages 510 may be calculated: again, the highest such access rate may be considered for migration to another storage tier.

In other embodiments of the disclosure, since pages 510 may be migrated (rather than just portions 515), first access time 805 and last access time 810 may be stored only once for each page 510 (rather than for each individual portion 515). Thus, the first access to any portion 515 in page 510 may result in first access time 805 and last access time 810 being set, and any subsequent accesses to any portion 515 in page 510 may update just last access time 810. In this manner, the rate of access for the entirety of page 510 may be tracked, rather than just tracking the rate of access for each individual portion 515. Thus, instead of using four, eight, or some other number of bytes to represent first access time 805 and last access time 810 for each portion 515, that number of bytes may be used to represent first access time 805 and last access time 810 for each page 510, reducing the size of table 705.

Figures 9, 10, 11:
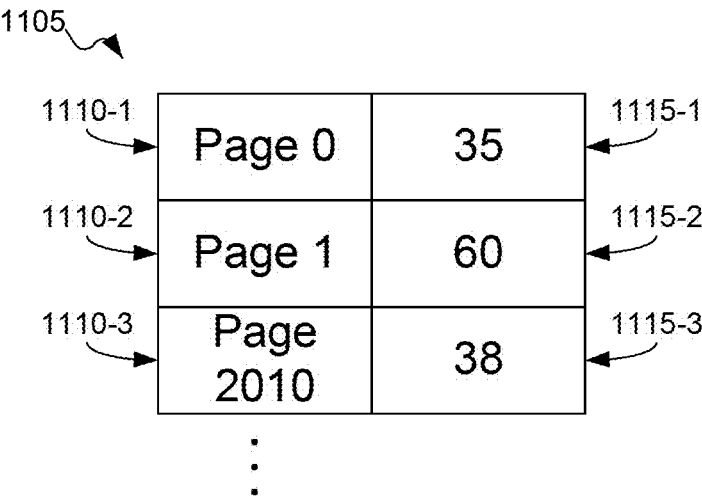
FIG. 9 shows an equation relating page size to cache block size, according to embodiments of the disclosure.
FIG. 10 shows an equation relating page temperature to cache block temperature, according to embodiments of the disclosure.
FIG. 11 shows details of a hot page list managed by the hotness tracker of FIG. 3, according to embodiments of the disclosure.

FIG. 9 shows an equation relating page size to cache block size, according to embodiments of the disclosure. In FIG. 9, assuming that each cache block has the same size (and therefore each portion 515 of FIG. 5 is the same size), and assuming that each page 510 of FIG. 5 includes the same number of portions 515 of FIG. 5, then the size of pages 510 of FIG. 5 may be calculated as the product of the size of each portion 515 of FIG. 5 (which would fit in cache blocks 605 of FIG. 6) and the number of portions 515 of FIG. 5 per page 510 of FIG. 5. Of course, if the assumptions mentioned above are not followed, then the size of each page 510 of FIG. 5 may be calculated using an appropriately modified equation.

FIG. 10 shows an equation relating page temperature to cache block temperature, according to embodiments of the disclosure. In one embodiment of the disclosure, the temperature of page 510 of FIG. 5 may be calculated as the sum of temperatures 710 of FIG. 7 of portions 515 of FIG. 5. In this manner, the temperature of page 510 of FIG. 5 may be calculated as the number of access requests for data in page 510 of FIG. 5.

In other embodiments of the disclosure, other equations may be used to calculate the temperature of page 510 of FIG. 5. For example, the temperature of page 510 of FIG. 5 might be calculated as a weighted sum, with the weight being determined as a percentage of the number of portions 515 of FIG. 5 in page 510 of FIG. 5 that have been accessed. In this manner, pages 510 of FIG. 5 that have more of their data accessed may be considered to be hotter than pages with a localized "hot spot" within page 510 of FIG. 5. (Of course, if such a localized "hot spot" is very heavily accessed, the temperature of page 510 of FIG. 5 with a localized "hot spot" might still be considered overall sufficiently hot to be considered for page placement module 325 of FIG. 3 to consider moving or copying the data into another memory tier.)

FIG. 11 shows details of a hot page list managed by hotness tracker 330 of FIG. 3, according to embodiments of the disclosure. In FIG. 11, hot page list 1105 is shown as a table. Hot page list 1105 may include information about various pages 510 of FIG. 5 that are currently up for consideration to be moved into another (hotter, meaning faster access) memory tier. For example, hot page list 1105 is shown as including identifiers 1110-1, 1110-2, and 1110-3 of pages currently considered hot within storage device 120 of FIG. 1. Identifiers 1110-1, 1110-2, and 1110-3 may be referred to collectively as identifiers 1110. Identifiers 1110 may identify the pages 510 of FIG. 5 that are up for consideration to be moved into another memory tier. For example, identifiers 1110 may include pointers to pages 510 of FIG. 5 that are up for consideration to be moved into another memory tier.

While FIG. 11 shows hot page list 1105 as including three identifiers 1110, embodiments of the disclosure may include any number (one or more, without bound) of identifiers 1110.

Note that while pages 510 of FIG. 5 contain data that might be moved, hotness tracker 330 might only store identifiers 1110 of pages 510 of FIG. 5, as identifier 1110 (such as a page number) may be stored more compactly than the data of page 510 of FIG. 5 itself. For example, if storage device 120 has a 4 KB page size, and assuming that there are, say, 20 pages currently considered "hot", storing the data for all 20 pages would require 80 KB of storage (20 pages×4 KB per page). But if the storage device is a 1 TB storage device, then the storage device includes 268,435,456 pages, then each page may be assigned a unique identifier using only four bytes (268,435,456=2$^{29}$, meaning that 29 bits are sufficient to distinguish among all the possible page identifiers, and four bytes includes 32 bits). Thus, using page identifiers, the size of hot page list 1105 may be reduced to just 80 bytes (20 pages×4 bytes per page identifier).

Hot page list 1105 may store identifiers 1110 in any desired order. In some embodiments of the disclosure, hot page list 1105 may store identifiers 1110 in a first in, first out (FIFO) manner. That is, one end of hot page list 1105 may be consider to be the start of hot page list 1105 and the other end maybe considered to be the end of hot page list 1105. In a FIFO list, identifiers 1110 may be organized in an oldest-to-newest (or newest-to-oldest) order. For example, identifier 1110-1 may be the entry first added to hot page list 1105, then identifier 1110-2, then identifier 1110-3, and so on until the most recently added identifier 1110 may be found.

In other embodiments of the disclosure, hot page list 1105 may be organized in other orderings. For example, hot page list 1105 might be organized so that pages 510 of FIG. 5 are identified in order of their temperature (from hottest to coldest, or from coldest to hottest). In such situations (among others), it may be useful to track the temperature of pages 510 of FIG. 5 identified in hot page list 1105.

While the temperature of each page 510 of FIG. 5, identified by identifier 1110, may always be calculated as needed, such calculation may require some amount of time, even if small. It may be more efficient to store the temperature of each page 510 of FIG. 5 associated with identifiers 1110, as shown in FIG. 11. Thus, temperature 1115-1 may represent the temperature of page 510 of FIG. 5 identified by identifier 1110-1, temperature 1115-2 may represent the temperature of page 510 of FIG. 5 identified by identifier 1110-2, and temperature 1115-3 may represent the temperature of page 510 of FIG. 5 identified by identifier 1110-3. Temperatures 1115-1, 1115-2, and 1115-3 may be referred to collectively as temperatures 1115.

The question might arise why the temperature of pages in hot page list 1105 are relevant. After all, once page 510 of FIG. 5 is considered hot, it should stay hot, right? But whether page 510 of FIG. 5 is considered hot may change over time. For example, page 510-1 of FIG. 5 might be accessed frequently enough over time to initially merit a place in hot page list 1105. But as data access requests change, page 510-1 of FIG. 5 might be considered to "cool down", and another page, such as page 510-2 of FIG. 5, might be considered to "heat up" enough to justify replacing page 510-1 of FIG. 5 in hot page list 1105. In addition, while the storage used for each entry in hot page list 1105 might not be large, hot page list 1105 may have a finite number of entries. After all entries in hot page list 1105 have been filled, if a new page is considered "hotter" than at least some pages in hot page list 1105, it may be desirable to remove a "cooler" page 510 of FIG. 5 from hot page list 1105 to make room for a "hotter" page 510 of FIG. 5. To determine whether to evict a page 510 of FIG. 5 from hot page list 1105 may therefore depend on the temperate of page 510 of FIG. 5. Thus, hot page list 1105 may store temperatures 1115 to expedite such comparison.

When hot page list 1105 is full and a new page 510 of FIG. 5 has been selected to be added to hot page list 1105, an existing page 510 of FIG. 5 in hot page list 1105 may be selected for eviction. Which page 510 of FIG. 5 is selected for eviction from hot page list 1105 may be done in any desired manner. In some embodiments of the disclosure, the oldest entry in hot page list 1105 may be selected for eviction. This embodiment of the disclosure may be most efficient where hot page list 1105 is itself implemented as a FIFO list. In other embodiments, page 510 of FIG. 5 with the lowest temperature 1115 in hot page list 1105 may be selected for eviction. Page 510 of FIG. 5 with the lowest temperature 1115 may be found at the head of hot page list 1105 if hot page list 1105 is organized by temperature, or by scanning temperatures 1115 in hot page list 1105.

But even after selecting page 510 of FIG. 5 in hot page list 1105 for eviction from hot page list 1105, that does not mean that page 510 of FIG. 5 should be evicted from hot page list 1105. For example, if the selected page 510 of FIG. 5 still has a higher temperature than the page 510 of FIG. 5 being considered for addition to hot page list 1105, then the existing hot page 510 of FIG. 5 should be kept in hot page list 1105 rather than being replaced with the new page 510 of FIG. 5. Thus, the temperatures 1115 of the two pages may be compared, and the existing page 510 of FIG. 5 may be replaced in hot page list 1105 with the new page 510 of FIG. 5 only if temperature 1115 of the new page 510 of FIG. 5 is hotter than temperature 1115 of the existing page 510 of FIG. 5.

A follow-up question is, when should page 510 of FIG. 5 be considered for entry into hot page list 1105. In some embodiments of the disclosure, the current temperature 1115 of page 510 of FIG. 5 (particularly after a request to access data from page 510 of FIG. 5) may be compared with a threshold. If temperature 1115 is below this threshold, then page 510 of FIG. 5 may not yet be considered for entry into hot page list 1105: only after temperature 1115 meets or exceeds this threshold may page 510 of FIG. 5 be considered for addition to hot page list 1105. Note that this approach may work regardless of whether temperature 1115 of page 510 of FIG. is measured as a sum of temperatures 710 of FIG. 7 for portions 515 of FIG. 5 in page 510 of FIG. 5, or as some calculation based on a rate of access for data in page 510 of FIG. 5.

With all this discussion about how to determine what pages belong in hot page list 1105, another question might arise: why track temperatures 710 of FIG. 7 of portions 515 of FIG. 5, if it is only pages 510 of FIG. 5 that are moved (or copied) between memory tiers. One answer may be found in using the number of portions 515 of FIG. 5 that have been accessed from the page as a weight for the final temperature of page 510 of FIG. 5. If only the temperatures of pages 510 of FIG. 5 are tracked, there is no information available regarding whether the data being accessed is in a "hot spot" or across the entire page 510 of FIG. 5. But another reason is that while pages 510 of FIG. 5 might be moved (or copied) between memory tiers, portions 515 of FIG. 5 may also be managed within storage device 120 of FIG. 1. More particularly, temperatures 710 of FIG. 7 may be used to select portions 515 of FIG. 5 to copy into cache blocks 605 of FIG. 6 of cache 440 of FIG. 4. Since cache 440 of FIG. 4 may store individual portions 515 of FIG. 5 in cache blocks 605 of FIG. 6 without necessarily storing the entirety of pages 510 of FIG. 5, tracking temperatures 710 of FIG. 7 may be used to determine what data to store in cache 440 of FIG. 4.

As discussed above, when a request to access portion 515 of FIG. 5 is received at storage device 120 of FIG. 1, temperature 710 of FIG. 7 for that portion 515 of FIG. 5 of that page 510 may be updated: for example, by incrementing temperature 710 of FIG. 7. Temperature 710 of FIG. 7 may then be compared with a threshold (which may be different from or the same as the threshold for adding page 510 of FIG. 5 to hot page list 1105). If temperature 710 of FIG. 7 meets or exceeds this threshold, then hotness tracker 330 of FIG. 3 may send a request to cache 440 of FIG. 4 (or its cache controller) to add portion 515 of FIG. 5 to cache 440 of FIG. 4. Cache 440 of FIG. 4 may then add portion 515 of FIG. 5 to cache block 605 of FIG. 6 (and may evict an existing portion 515 of FIG. 5 from that cache block 605 of FIG. 6 if necessary). Note that the decision whether to cache portion 515 of FIG. 5 in cache 440 of FIG. 4 may be made independently of whether to add page 510 of FIG. 5 including portion 515 of FIG. 5 to hot page list 1105.

The above discussion focuses on hot page list 1105 as tracking which pages in storage device 120 of FIG. 1 are considered to be the "hottest" pages, and therefore best selected for moving (or copying) into a faster memory tier. But using similar techniques, hot page list 1105 may be modified to represent a "cold" page list: that is, a list of pages that might best be moved (or copied) to a slower memory tier. In addition, hotness tracker 1105 may store both hot page list 1105 and a cold page list.

As discussed above, embodiments of the disclosure may implement different approaches to determining whether a particular page 510 of FIG. 5 is considered "hot" or "cold". In some embodiments of the disclosure, storage device 120 of FIG. 1 may implement multiple such approaches. But if storage device 120 of FIG. 1 may support multiple different approaches for determining the temperature of pages 510 of FIG. 5, then the question arises how storage device 120 may select from between/among the various approaches.

In some embodiments of the disclosure, storage device 120 may use heuristics to select among various different approaches. For example, if the workload is expected to be short term, then temperature 710 of FIG. 7 may be used; if the workload is expected to be long term, then the rate of access as described with reference to FIG. 8 above may be used. Or, an administrator, such as a user, may set a schedule. For example, between the hours of 9:00 am and 5:00 pm, one approach to determining hotness may be used, whereas outside of those hours another approach to determining hotness may be used. Or, storage device 120 of FIG. 1 may try out each approach for some amount of time, and may select the approach that results in the best cache hit rate.

While the above discussion is focused on storage device 120 of FIG. 1 that may also (internally) cache portions 515 of FIG. 5, embodiments of the disclosure may also be used in devices that do not (internally) cache portions 515 of FIG. 5. For example, the approach to determining a rate of access for portions 515 of FIG. 5 may also be used to determine rates of access for pages 510 of FIG. 5, and may be used in, for example, memory 115 of FIG. 1, CXL DRAM 315 of FIG. 3, and/or NVMe SSD 320 of FIG. 3.

Figure 12:
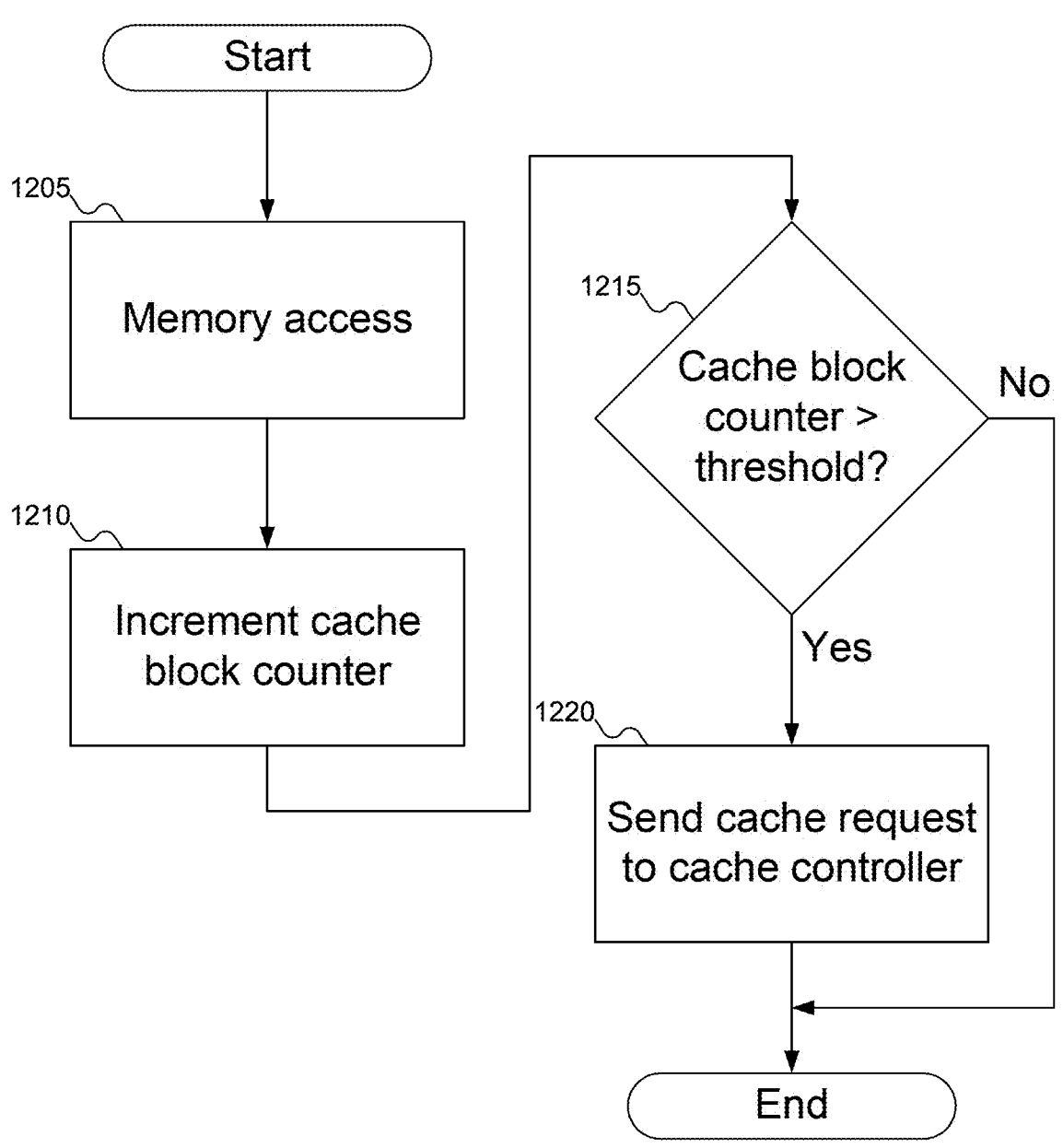
FIG. 12 shows a flowchart of an example procedure for determining whether to cache data in the cache of FIG. 4, according to embodiments of the disclosure.

FIG. 12 shows a flowchart of an example procedure for determining whether to cache data in cache 440 of FIG. 4, according to embodiments of the disclosure. In FIG. 12, at block 1205, portion 515 of FIG. 5 of page 510 of FIG. 5 may be accessed. At block 1210, hotness tracker 330 of FIG. 3 may increment the counter (temperature 710 of FIG. 7) for portion 515 of FIG. 5 of page 510 of FIG. 5 that was accessed. At block 1215, hotness tracker 330 of FIG. 3 may compare the counter (temperature 710 of FIG. 7) with the threshold for caching portion 515 of FIG. 5. If the counter (temperature 710 of FIG. 7) meets or exceeds the threshold, then at block 1220, hotness tracker 330 of FIG. 3 may send a request to cache 440 of FIG. 4 (or its controller) to cache portion 515 of FIG. 5 in cache 440 of FIG. 4.

Figure 13A:
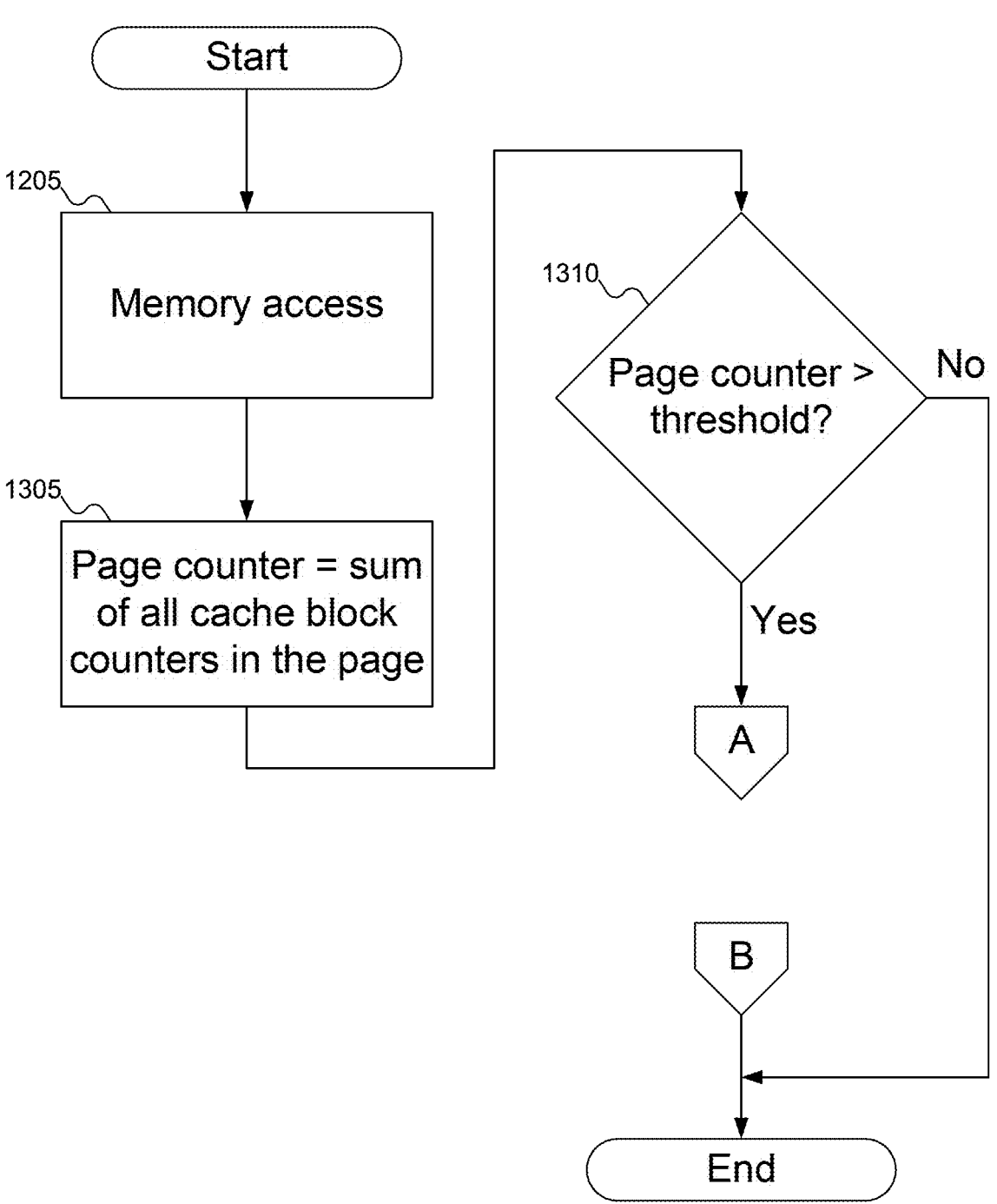
FIG. 13A shows a flowchart of an example procedure for determining whether to update the hot page list of FIG. 11, according to embodiments of the disclosure.
Figure 13B:
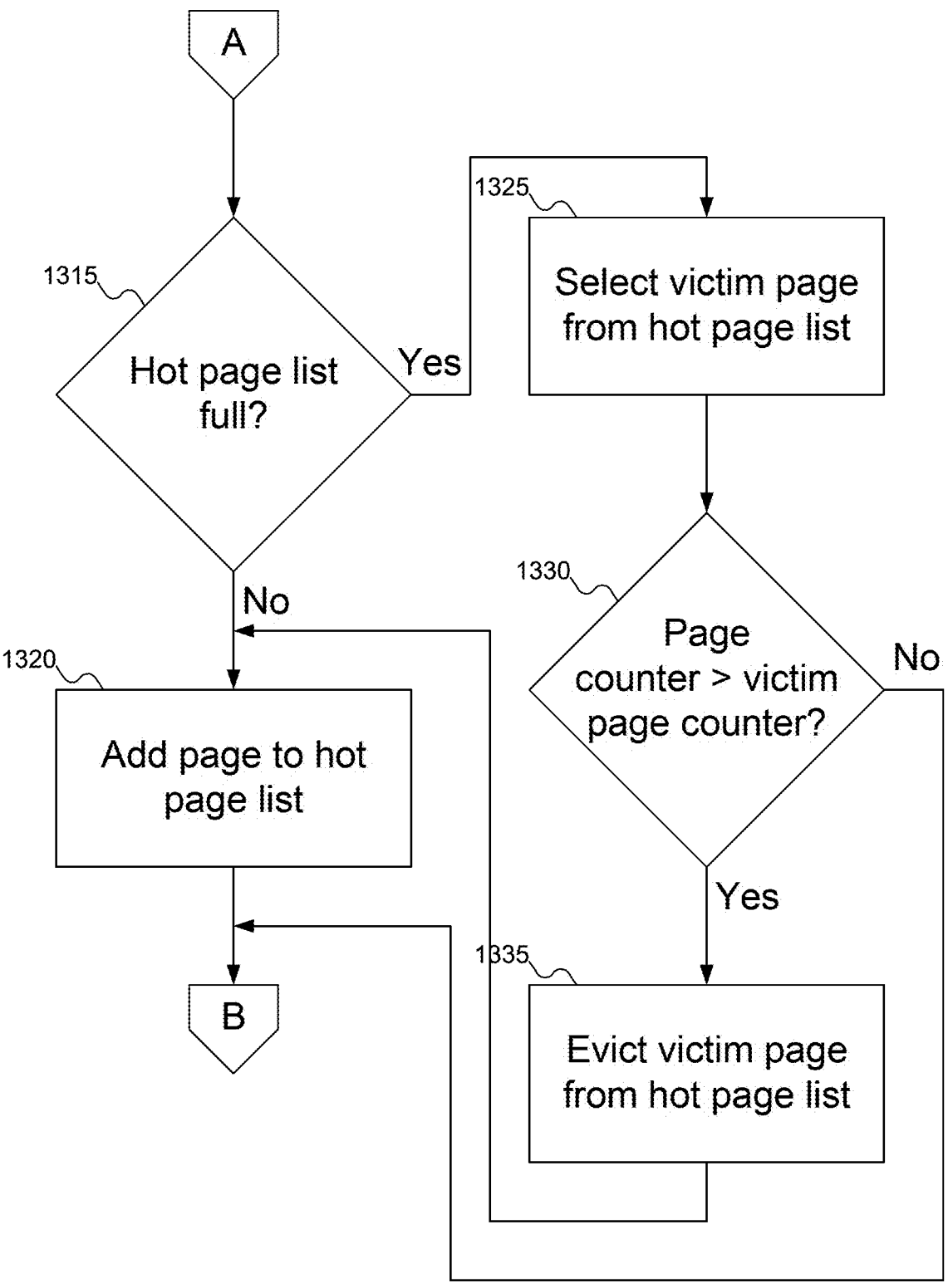
FIG. 13B continues the flowchart of an example procedure for determining whether to update the hot page list of FIG. 11, according to embodiments of the disclosure.

FIGS. 13A-13B show a flowchart of an example procedure for determining whether to update hot page list 1105 of FIG. 11, according to embodiments of the disclosure. In FIG. 13A, at block 1205 (the same data access as shown in FIG. 12), portion 515 of FIG. 5 of page 510 of FIG. 5 may be accessed. At block 1305, hotness tracker 330 of FIG. 3 may compute temperature 1115 of FIG. 11 of page 510 of FIG. 5 by summing temperatures 710 of FIG. 7 for all portions 515 of FIG. 5 in that page 510 of FIG. 5. At block 1310, hotness tracker 330 of FIG. 3 may compare temperature 1115 of FIG. 11 with the threshold for adding page 510 of FIG. 5 to hot page list 1105 of FIG. 11. If temperature 1105 of FIG. 11 does not meet or exceed the threshold for adding page 510 of FIG. 5 to hot page list 1105 of FIG. 11, then processing may end.

On the other hand, if temperature 1105 of FIG. 11 meets or exceeds the threshold for adding page 510 of FIG. 5 to hot page list 1105 of FIG. 11, then at block 1315 (FIG. 13B), hotness tracker 330 of FIG. 3 may check to see if hot page list 1105 of FIG. 11 is full. If hot page list 1105 of FIG. 11 is not full, then at block 1320 hotness tracker 330 of FIG. 3 may add page 510 of FIG. 5 to hot page list 1105 of FIG. 11 and processing may end. Otherwise, at block 1325, hotness tracker 330 of FIG. 3 may select a victim page from hot page list 1105 of FIG. 11. At block 1330, hotness tracker 330 of FIG. 3 may compare temperature 1115 of FIG. 11 of page 510 of FIG. 5 with temperature 1115 of FIG. 11 of the victim page in hot page list 1105 of FIG. 11. If temperature 1115 of FIG. 11 of page 510 of FIG. 5 exceeds temperature 1115 of FIG. 11 of the victim page, then at block 1335 hotness tracker 330 of FIG. 3 may evict the victim page from hot page list 1105 of FIG. 11, and processing may return to block 1320 for hotness tracker 330 of FIG. 3 to add page 510 of FIG. 5 to hot page list 1105 of FIG. 11. Otherwise, hotness tracker 330 of FIG. 3 may leave the victim page in hot page list 1105 of FIG. 3, and processing may end.

In FIGS. 12-13B, various comparisons are shown: for example, in blocks 1215, 1310, and 1330. While FIGS. 12-13B show these comparisons as requiring a strict inequality (that is, strictly greater than or strictly less than comparisons), embodiments of the disclosure may also include comparisons where equality is also permitted (that is, not less than or not greater than comparisons). Embodiments of the disclosure may also support variations on inequalities described elsewhere in this document, whether or not explicitly explained.

Figure 14:
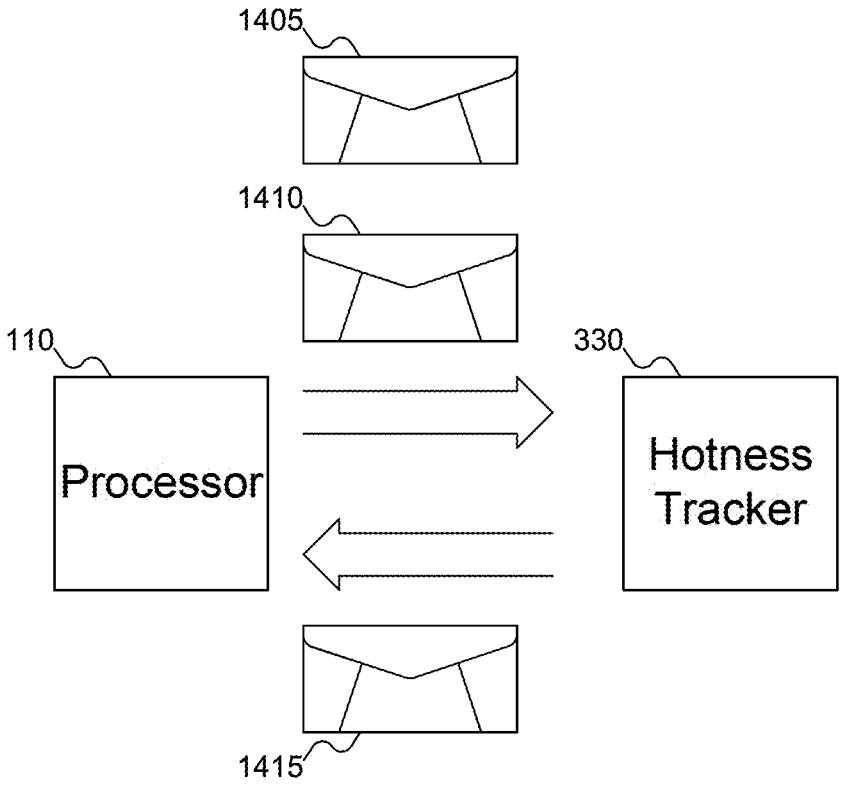
FIG. 14 shows the processor of FIG. 1 requesting the hot page list of FIG. 11 from the hotness tracker of FIG. 3, according to embodiments of the disclosure.

FIG. 14 shows processor 110 of FIG. 1 requesting hot page list 1105 of FIG. 11 from hotness tracker 330 of FIG. 3, according to embodiments of the disclosure. In FIG. 14, processor 110 may send data access request 1405 to access some portion 515 of FIG. 5 of some page 510 of FIG. 5 on storage device 120. At some point thereafter, processor 110 may send request 1410 to hotness tracker 330 (more likely, to storage device 120 of FIG. 1, with controller 415 of FIG. 4 delivering request 1410 to hotness tracker 330). In response, hotness tracker 330 may send hot page list 1105 of FIG. 11 back to processor 110 in message 1415.

Figure 15:
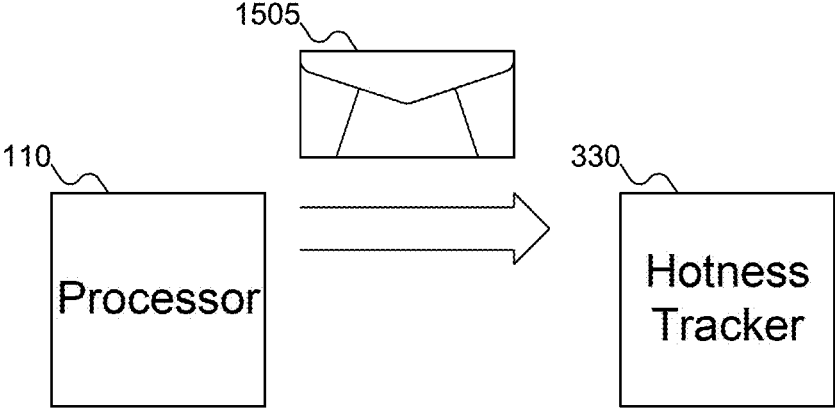
FIG. 15 shows the processor of FIG. 1 requesting that the hotness tracker of FIG. 11 reset the temperatures of the pages/cache blocks, according to embodiments of the disclosure.

FIG. 15 shows processor 110 of FIG. 1 requesting that hotness tracker 330 of FIG. 3 reset the temperatures of the pages/cache blocks, according to embodiments of the disclosure. In FIG. 15, processor 110 may send request 1505 to hotness tracker 330 (more likely, to storage device 120 of FIG. 1, with controller 415 of FIG. 4 delivering request 1505 to hotness tracker 330). In response, hotness tracker 330 may then reset temperatures 710 of FIG. 7 for portions 515 of FIG. 5 of pages 510 of FIG. 5, so that tracking temperatures 710 of FIG. 7 may start fresh. Note that in some embodiments of the disclosure, this reset operation may also involve resetting temperatures 1115 of FIG. 11 for pages 510 of FIG. 5 in hot page list 1105 of FIG. 11. Note too that in some embodiments of the disclosure, hotness tracker 330 may reset temperatures 710 of FIG. 7 more selectively based on request 1505. For example, hotness tracker 330 might reset only portions 515 of FIG. 5 of particular pages 510 of FIG. 5, or might reset only particular portions 515 of FIG. 5 in pages 510 of FIG. 5, or any combination thereof. In short, any way processor 110 might specify what portions 515 of FIG. 5 to reset may be used. But in some embodiments of the disclosure, the default may be to reset all portions 515 of FIG. 5 for all pages 510 of FIG. 5.

Figure 16A:
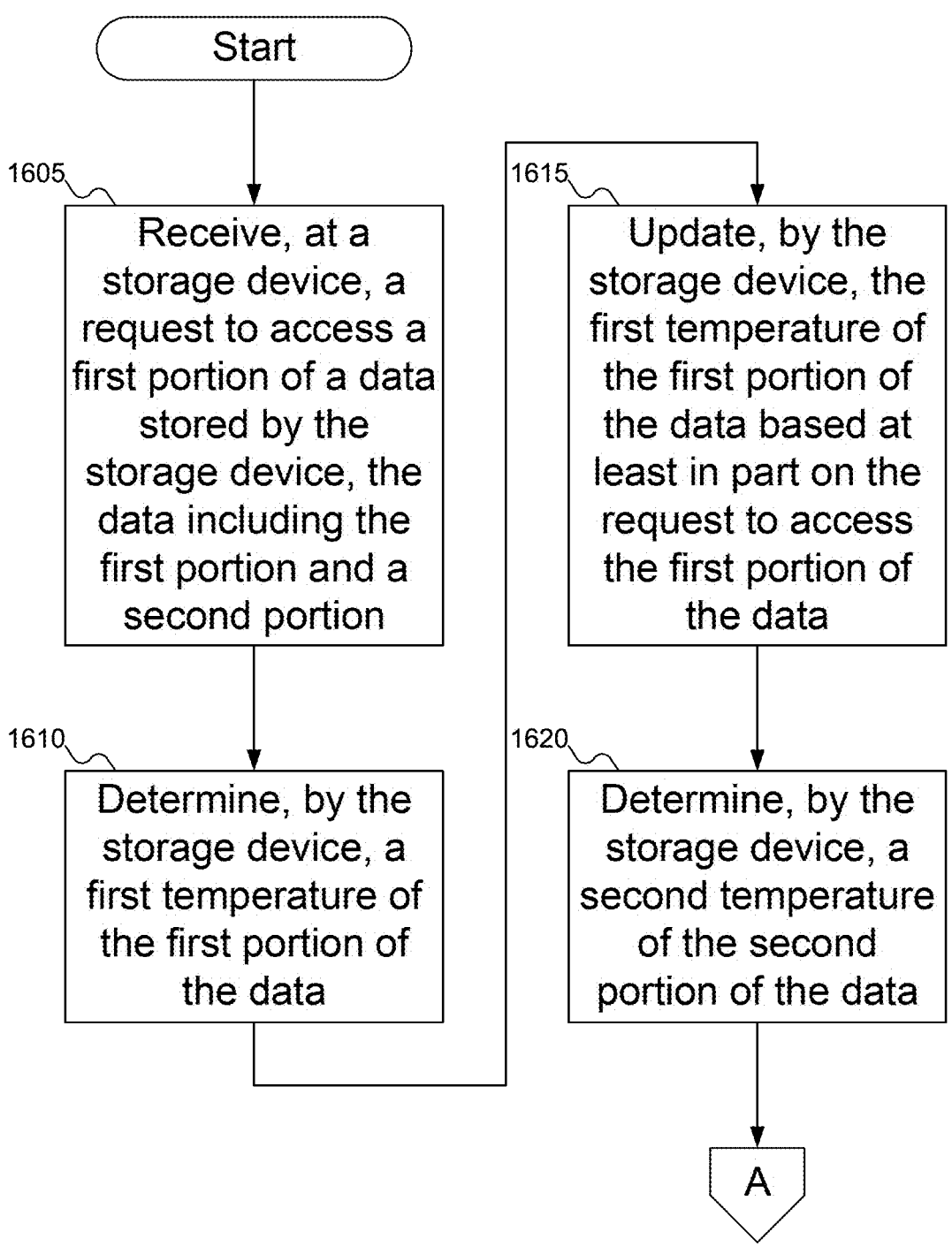
FIG. 16A shows a flowchart of an example procedure for the hotness tracker of FIG. 3 to update the hot page list of FIG. 11, according to embodiments of the disclosure.
Figure 16B:
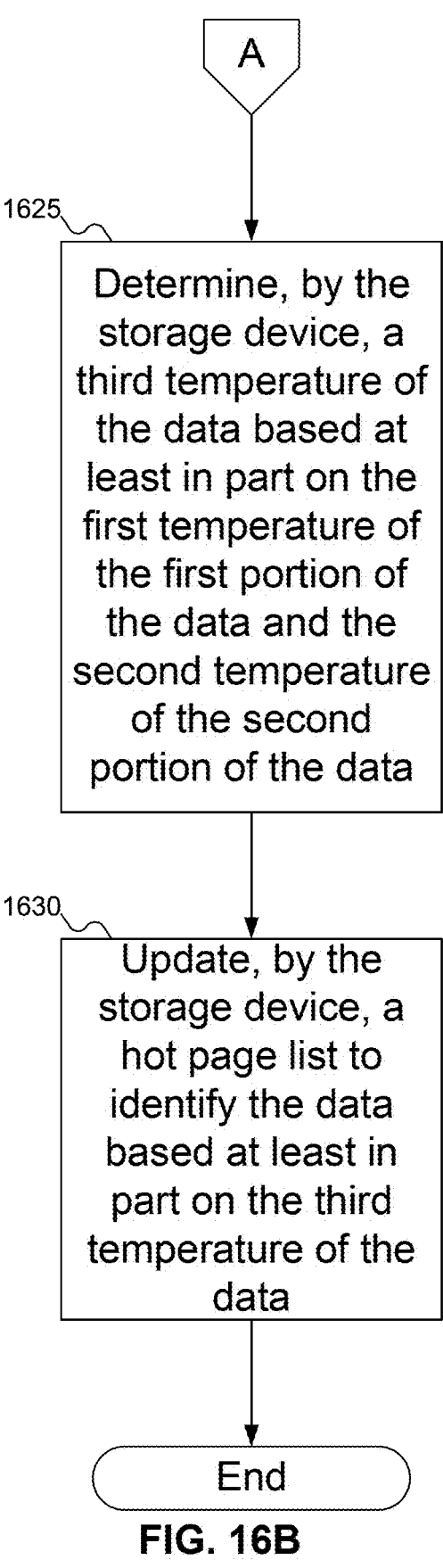
FIG. 16B continues the flowchart of an example procedure for the hotness tracker of FIG. 3 to update the hot page list of FIG. 11, according to embodiments of the disclosure.

FIGS. 16A-16B show a flowchart of an example procedure for hotness tracker 330 of FIG. 3 to update hot page list

1105 of FIG. 11, according to embodiments of the disclosure. In FIG. 16A, at block 1605, storage device 120 of FIG. 1 may receive request 1405 of FIG. 14 to access portion 515 of FIG. 5 of page 510 of FIG. 5. As shown in FIG. 5, page 510 of FIG. 5 may include multiple portions 515, and therefore request 1405 of FIG. 14 might not be a request to access all the data in page 510 of FIG. 5. It is also worth noting that the data in page 510 of FIG. might only represent a portion of the overall data that includes page 510 of FIG. 5. For example, page 510 of FIG. 5 might be one page 510 of FIG. 5 in a block in storage device 120 of FIG. 1, with the entirety of the data spanning multiple blocks in storage device 120 of FIG. 1. Note too that storage device 120 of FIG. 1 may also store other data, potentially in page 510 of FIG. 5, a block including page 510 of FIG. 5, or elsewhere. At block 1610, hotness tracker 330 of FIG. 3 may determine temperature 710 of FIG. 7 of portion 515 of FIG. 5 of page 510 of FIG. 5. At block 1615, hotness tracker 330 of FIG. 3 may update temperature 710 of FIG. 7 based on request 1405 of FIG. 14 to access portion 515 of FIG. 5 of page 510 of FIG. 5.

At block 1620, hotness tracker 330 of FIG. 3 may determine a second temperature 710 of FIG. 7 of a second portion 515 of FIG. 5 of page 510 of FIG. 5. At block 1625 (FIG. 16B), hotness tracker 330 of FIG. 3 may determine temperature 1115 of FIG. 11 of page 510 of FIG. 5 based on temperature 710 of FIG. 7 of the first portion 515 of FIG. 5 of page 510 and the second temperature 710 of FIG. 7 of the second portion 515 of FIG. 5 of page 510 of FIG. 5. As discussed above, determining temperature 1115 of FIG. 11 of page 515 of FIG. 5 may be done by accessing temperature 1115 of FIG. 11 from storage somewhere (such as storage 445 of FIG. 4 of storage device 120 of FIG. 1) appropriately incremented or otherwise updated based on request 1405 of FIG. 14 to access portion 515 of FIG. 5 of page 510, or by computing temperature 1115 of FIG. 11 from temperatures 710 of FIG. 7 of portions 515 of FIG. 5 of page 510 of FIG. 5 (such as by summing temperatures 710 of FIG. 7 of portions 515 of FIG. 5 of page 510 of FIG. 5, weighted or not). At block 1630, hotness tracker 330 of FIG. 3 may update hot page list 1105 of FIG. 11 based on temperature 1115 of FIG. 11 of page 510 of FIG. 5, as determined in block 1625.

Figure 17:
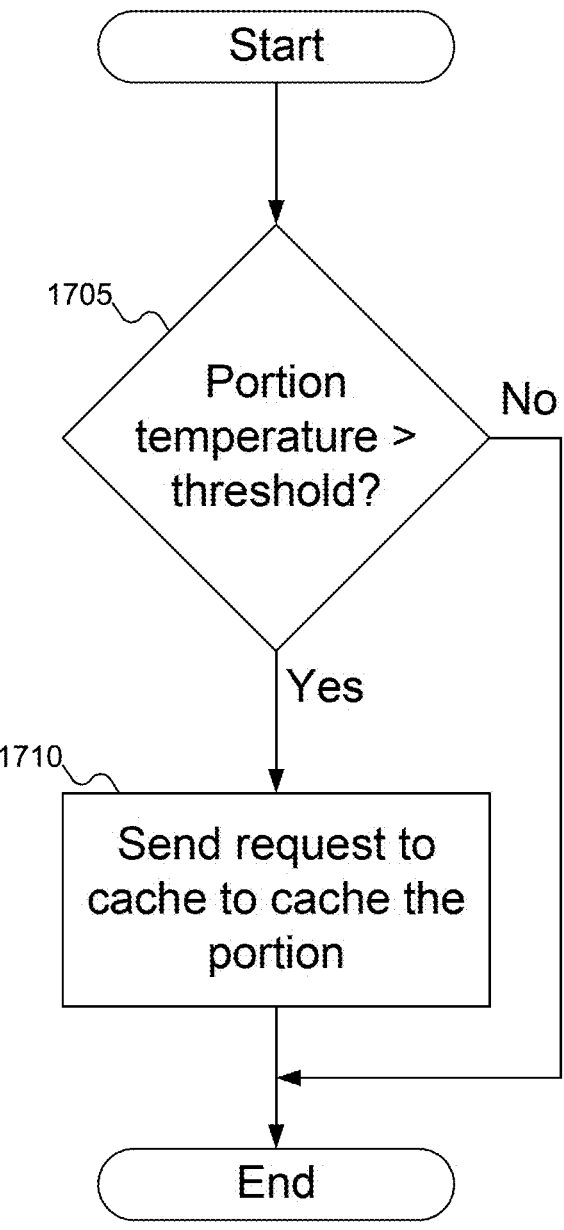
FIG. 17 shows a flowchart of an example procedure for the hotness tracker of FIG. 3 to determine whether to update the cache of FIG. 4, according to embodiments of the disclosure.

FIG. 17 shows a flowchart of an example procedure for hotness tracker 330 of FIG. 3 to determine whether to update cache 440 of FIG. 4, according to embodiments of the disclosure. The operations performed in FIG. 17 may be included in FIGS. 16A-16B, for example, after block 1615 of FIG. 16. In FIG. 17, at block 1705, hotness tracker 330 of FIG. 3 may compare temperature 710 of FIG. 7 of portion 515 of FIG. 5 of page 510 of FIG. 5 with a threshold for inclusion in cache 440 of FIG. 4. If temperature 710 of FIG. 7 of portion 515 of FIG. 5 of page 510 of FIG. 5 does not meet or exceed the threshold for inclusion in cache 440 of FIG. 4, then processing in FIG. 17 may conclude. Otherwise, at block 1710, hotness tracker 330 of FIG. 3 may send a request to cache 440 of FIG. 4 (more particularly, for example, to a controller of cache 440 of FIG. 4) to add portion 515 of FIG. 5 of page 510 of FIG. 5 to cache 440 of FIG. 4.

Figure 18A:
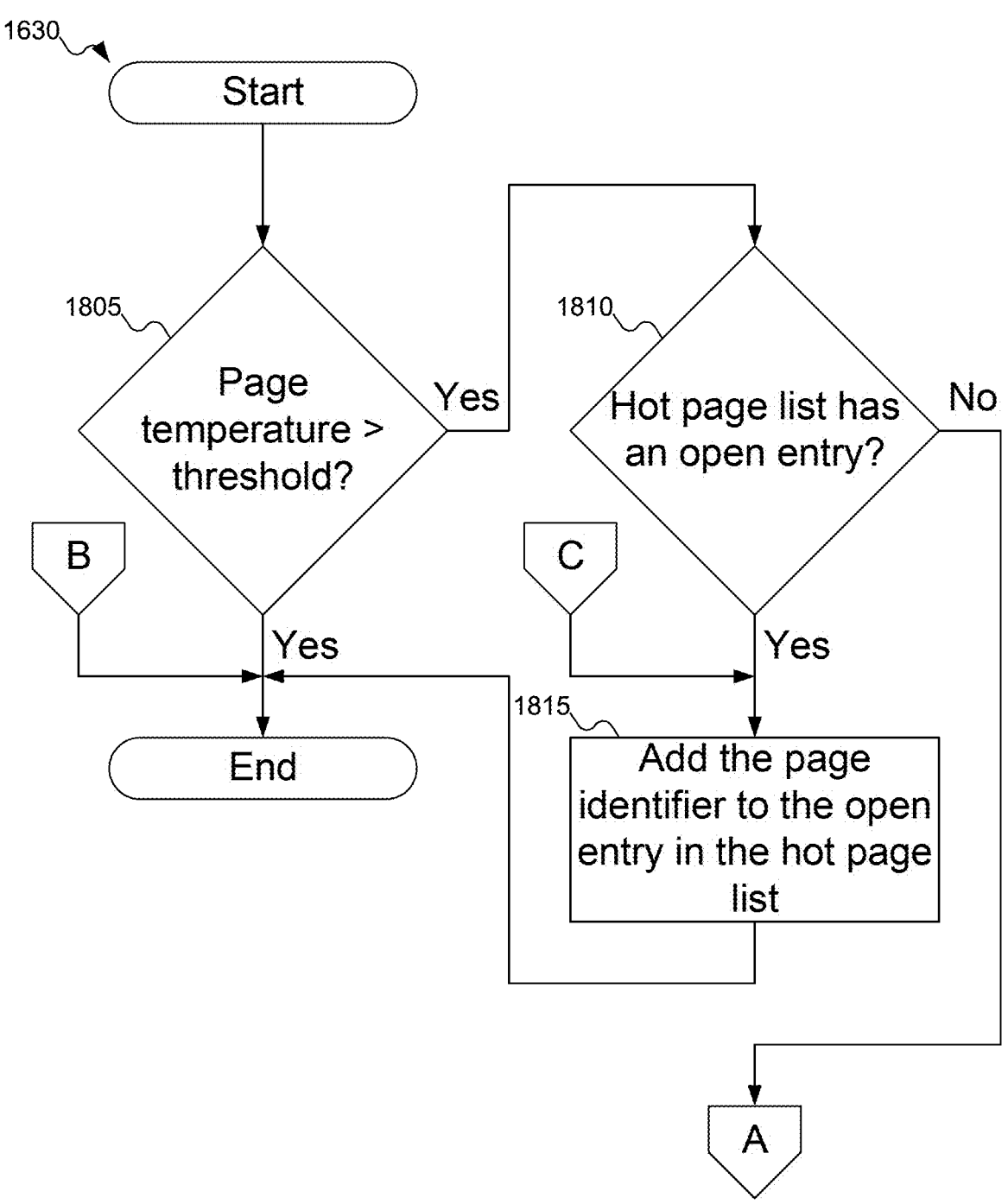
FIG. 18A shows a flowchart of an example procedure for the hotness tracker of FIG. 3 to update the hot page list of FIG. 11, according to embodiments of the disclosure.
Figure 18B:
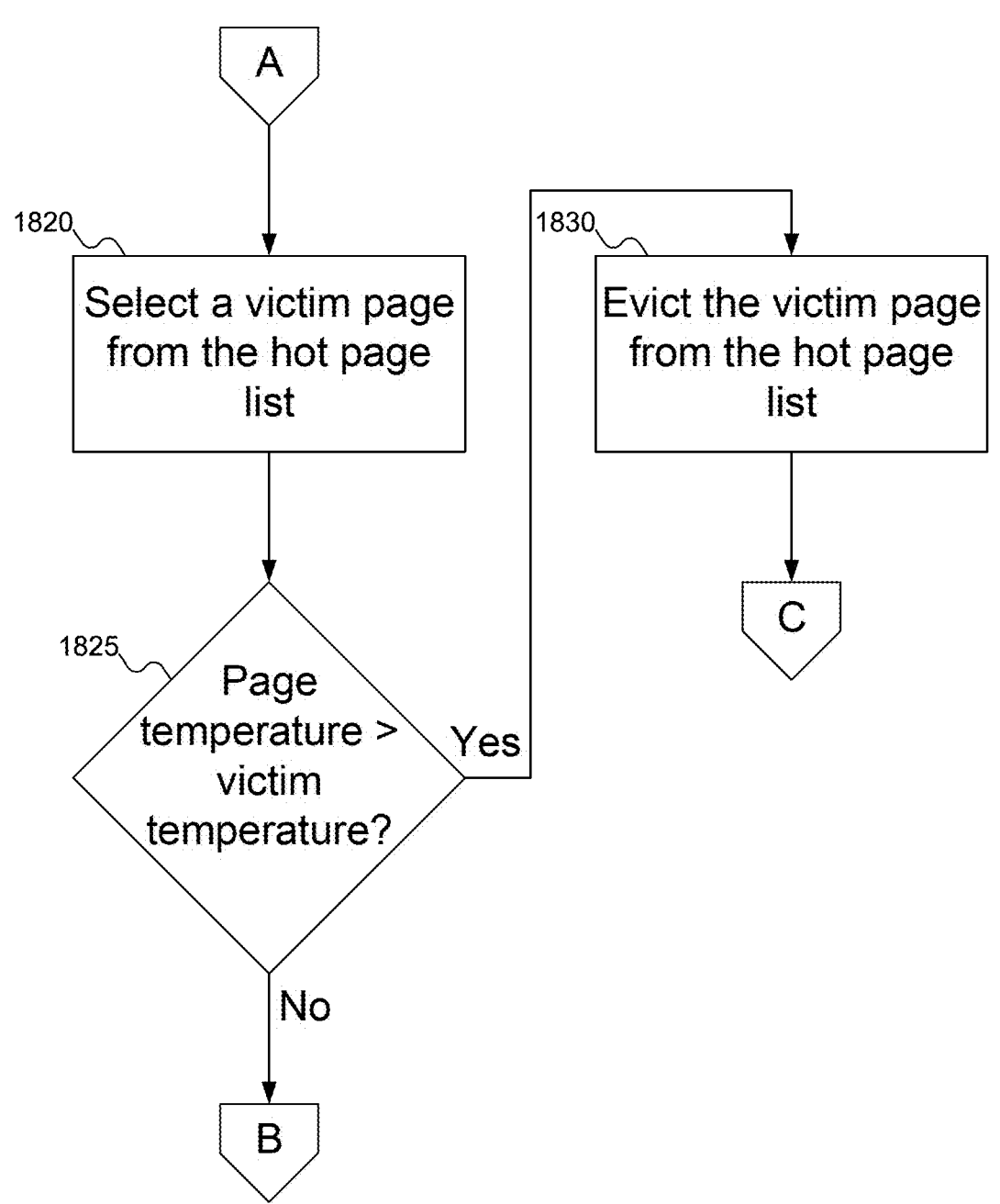
FIG. 18B continues the flowchart of an example procedure for the hotness tracker of FIG. 3 to update the hot page list of FIG. 11, according to embodiments of the disclosure.

FIGS. 18A-18B show a flowchart of an example procedure for hotness tracker 330 of FIG. 3 to update hot page list 1105 of FIG. 11, according to embodiments of the disclosure. The operations performed in FIGS. 18A-18B may be included in FIGS. 16A-16B, for example, as part of block 1630 of FIG. 16. In FIG. 18A, at block 1805, hotness tracker 330 of FIG. 3 may compare temperature 1115 of FIG. 11 of page 510 of FIG. 5 with a threshold for inclusion in hot page list 1105 of FIG. 11. If temperature 1115 of FIG. 11 of page 510 of FIG. 5 does not meet or exceed the threshold for inclusion in hot page list 1105 of FIG. 11, then processing in FIGS. 18A-18B may conclude.

Otherwise, at block 1810, hotness tracker 330 of FIG. 3 may check to see if hot page list 1105 of FIG. 11 has an opening for a new page to be added to hot page list 1105 of FIG. 11. If so, then at block 1815, identifier 1110 of FIG. 11 of page 510 of FIG. 5 may be added to hot page list 1105 of FIG. 11 (and temperature 1115 of FIG. 11 may be stored with identifier 1110 of FIG. 11 of page 510 of FIG. 5 in hot page list 1105 of FIG. 11 if appropriate).

On the other hand, if hot page list 1105 of FIG. 11 is currently full—that is, there is no opening to add a new page to hot page list 1105 of FIG. 11—then at block 1820 (FIG. 18B), hotness tracker 330 of FIG. 3 may select a victim page from hot page list 1105 of FIG. 11. The victim page may be the page at the top of hot page list 1105 of FIG. 11—that is, the page in hot page list 1105 of FIG. 11 that was earliest added to hot page list 1105 of FIG. 11—or may be the page with the lowest temperature 1115 of FIG. 11: other policies may also be used to select the victim page. At block 1825, hotness tracker 330 of FIG. 3 may compare temperature 1115 of FIG. 11 of the new page with temperature 1115 of FIG. 11 of the victim page. If the temperature 1115 of FIG. 11 of the new page does not meet or exceed temperature 1115 of FIG. 11 of the victim page, then processing in FIGS. 18A-18B may conclude (the victim page may be considered hotter than the new page). Otherwise, at block 1830, hotness tracker 330 of FIG. 3 may evict the victim page from hot page list 1105 of FIG. 11, after which processing may return to block 1815 to add the new page 510 of FIG. 5 to hot page list 1105 of FIG. 11.

Figure 19:
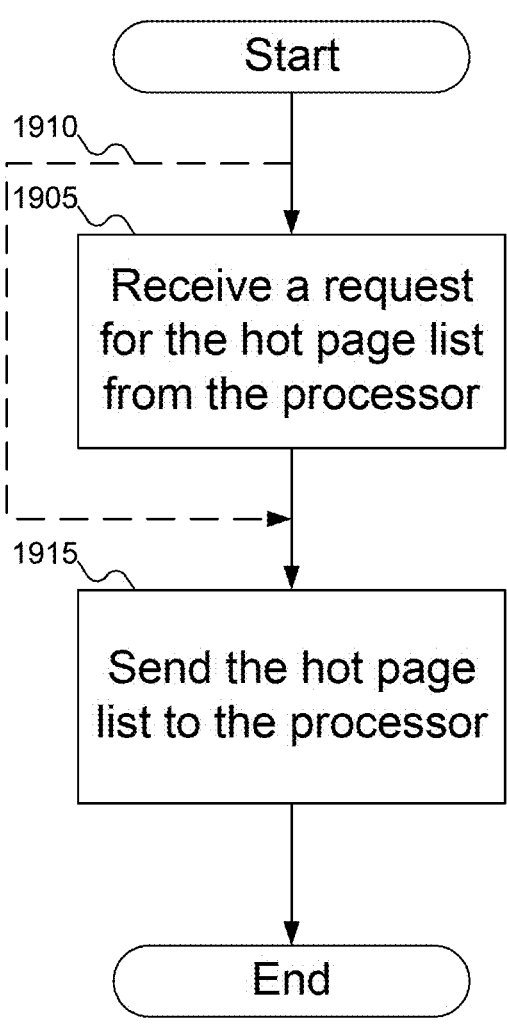
FIG. 19 shows a flowchart of an example procedure for the hotness tracker of FIG. 3 to send the hot page list of FIG. 11 to the processor of FIG. 1, according to embodiments of the disclosure.

FIG. 19 shows a flowchart of an example procedure for hotness tracker 330 of FIG. 3 to send hot page list 1105 of FIG. 11 to processor 110 of FIG. 1, according to embodiments of the disclosure. In FIG. 19, at block 1905, storage device 120 of FIG. 1 may receive request 1410 of FIG. 14 for hot page list 1105 of FIG. 11 from processor 110 of FIG. 1. As shown by dashed line 1910, block 1905 may be omitted. Finally, at block 1915, hotness tracker 330 of FIG. 3 may send hot page list 1105 of FIG. 11 to processor 110 of FIG. 1. Note that in embodiments of the disclosure where block 1905 is omitted, hotness tracker 330 of FIG. 3 may send hot page list 1105 of FIG. 11 to processor 110 of FIG. 1 based on other factors, such as the start or end of an epoch or a policy to send hot page list 1105 of FIG. 11 to processor 110 of FIG. 1 according to some schedule.

Figure 20:
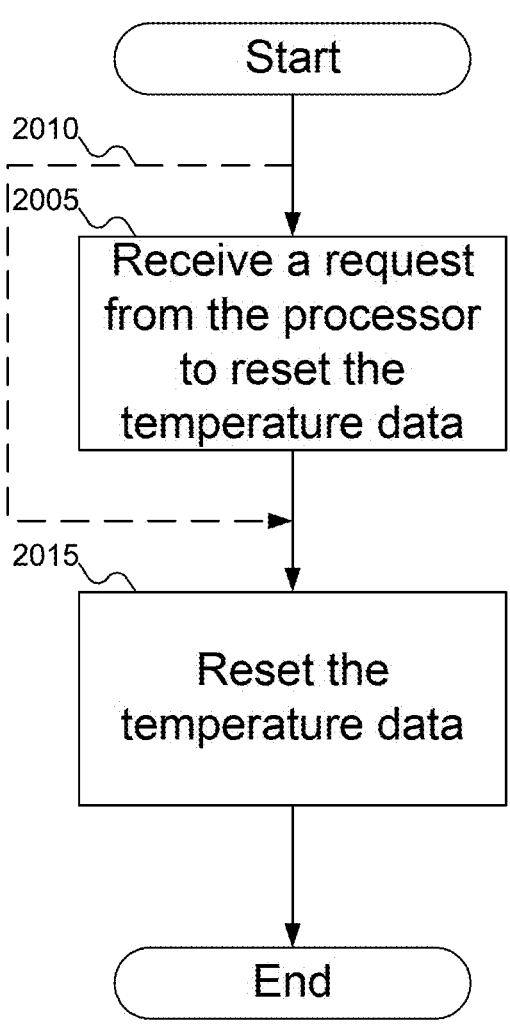
FIG. 20 shows a flowchart of an example procedure for the hotness tracker of FIG. 3 to reset the temperatures of the pages/cache blocks, according to embodiments of the disclosure.

FIG. 20 shows a flowchart of an example procedure for hotness tracker 330 of FIG. 3 to reset the temperatures of the pages/cache blocks, according to embodiments of the disclosure. In FIG. 20, at block 2005, storage device 120 of FIG. 1 may receive request 1505 of FIG. 15 to reset temperatures 710 of FIG. 7 (and possibly temperatures 1115 of FIG. 11) from processor 110 of FIG. 1. As shown by dashed line 2010, block 2005 may be omitted. Finally, at block 2015, hotness tracker 330 of FIG. 3 may reset temperatures 710 of FIG. 7 (and possibly temperatures 1115 of FIG. 11). Note that in embodiments of the disclosure where block 2005 is omitted, hotness tracker 330 of FIG. 3 may reset temperatures 710 of FIG. 7 (and possibly temperatures 1115 of FIG. 11) based on other factors, such as the start or end of an epoch or a policy to send hot page list 1105 of FIG. 11 to processor 110 of FIG. 1 according to some schedule.

Figure 21:
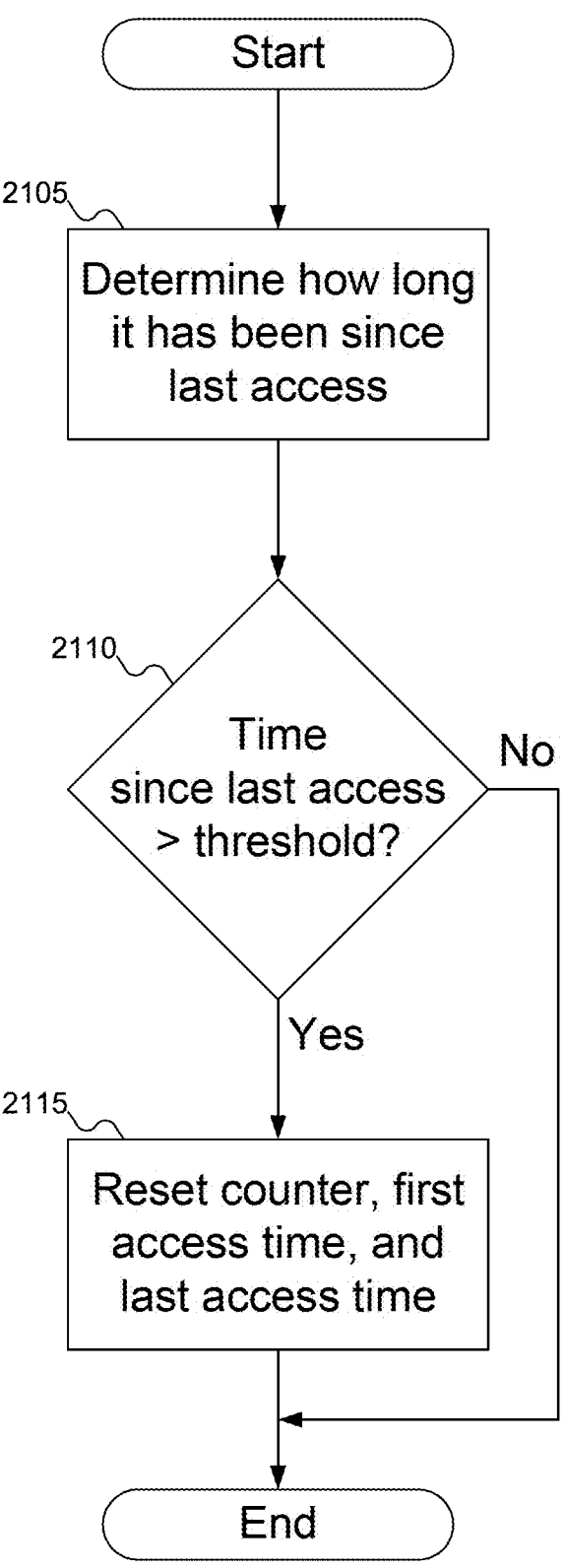
FIG. 21 shows a flowchart of an example procedure for the hotness tracker of FIG. 3 to reset the first access time of FIG. 8 and the last access time of FIG. 8 of the pages/cache blocks, according to embodiments of the disclosure.

FIG. 21 shows a flowchart of an example procedure for hotness tracker 330 of FIG. 3 to reset first access time 805 of FIG. 8 and last access time 810 of FIG. 8 of the pages/cache blocks, according to embodiments of the disclosure. In FIG. 21, at block 2105, hotness tracker 330 of FIG. 3 may determine how long it has been since last access time 810 of FIG. 8: that is, the difference between last access time 810 and the current time. At block 2110, hotness tracker 330 of FIG. 3 may compare this difference with a threshold. If this difference is greater than a threshold, then at block 2115, hotness tracker 330 of FIG. 3 may reset temperature 710 of FIG. 7, first access time 805, and last access time 810 of FIG. 8. Note that if first access time 805 and last access time 810 of FIG. 8 are associated with individual pages 510 of FIG. 5 rather than portions 515 of FIG. 5, then resetting temperature 710 of FIG. 7 may involve resetting temperature 710 of FIG. 7 for each portion 515 of FIG. 5 in page 510 of FIG. 5.

In FIGS. 12-13B and 16A-21, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure may include a hotness tracker in a storage device. The hotness tracker may be used to report to the host processor which pages stores in the storage device are considered hottest for consideration for moving (or copying) to another memory tier. By using the hotness tracker to track the hottest pages in the storage device, the kernel executing on the processor may have fewer processing steps to perform, thereby providing a technical advantage by permitting the host processor to carry on with other tasks.

In some embodiments of the disclosure, the hotness tracker may also identify portions of pages to be stored in a cache in the storage device. By recommending portions of pages for caching, data access may be expedited, thereby providing another technical advantage.

Storage devices that support a cache-coherent interconnect protocol, such as the Compute Express Link® (CXL®) protocol, enable the host processor to access data from the storage device as though the data was stored in main memory. That is, the storage device may function as an extension of main memory.

Embodiments of the disclosure introduce a hotness tracker inside CXL Solid State Drive (SSD) that tracks data temperature at a cache block granularity. Page movements between memory tiers may occur at, for example, a 4 KB granularity.

Hot pages may be placed in a fast tier (e.g., main memory Dynamic Random Access Memory (DRAM)), warm pages may be placed in CXL DRAM, and cold pages may be placed in CXL SSD.

The CXL SSD may cache the hottest cache blocks within a cold page in an internal device cache.

The CXL SSD may maintain a list of hottest pages sent to kernel when requested.

The hotness tracker may detect hot blocks to decide if a block should be cached in CXL SSD internal cache. The hotness tracker may track hot pages to determine which pages are hottest in CXL SSD. The hotness tracker may create a host page list to return to the kernel when requested.

The hotness tracker may maintain counter metadata (e.g., 1-byte counter per cache block CB) and hottest page list. The space requirements for the counter metadata may be relatively small: for example, 268 MB (for 1 TB of storage and 4 KB cache blocks).

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a storage device, comprising:

a storage medium to store a data, the data including a first portion and a second portion;

a cache to store the first portion of the data in a first cache block;

a controller to access the data from the storage medium or the cache; and a hotness tracker to track a first temperature of the first portion of the data and a second temperature of the second portion of the data and to compute a third temperature of the data based at least in part on the first temperature of the first portion of the data and the second temperature of the second portion of the data.

Statement 2. An embodiment of the disclosure includes the storage device according to statement 1, wherein:

the data includes a page size;

the first cache block includes a cache block size; and the cache block size is smaller than the page size.

Statement 3. An embodiment of the disclosure includes the storage device according to statement 1, wherein the storage device includes a Solid State Drive (SSD).

Statement 4. An embodiment of the disclosure includes the storage device according to statement 3, wherein the SSD includes a cache-coherent interconnect protocol SSD.

Statement 5. An embodiment of the disclosure includes the storage device according to statement 4, wherein the cache-coherent interconnect protocol SSD includes a Compute Express Link (CXL) SSD.

Statement 6. An embodiment of the disclosure includes the storage device according to statement 1, further comprising a second storage medium to store the first temperature of the first portion of the data and the second temperature of the second portion of the data.

Statement 7. An embodiment of the disclosure includes the storage device according to statement 1, further comprising a second storage medium to store the third temperature of the data based at least in part on the first temperature of the first portion of the data and the second temperature of the second portion of the data.

Statement 8. An embodiment of the disclosure includes the storage device according to statement 1, wherein the hotness tracker is configured to update the first temperature of the first portion of the data based at least on a request to access the first portion of the data.

Statement 9. An embodiment of the disclosure includes the storage device according to statement 8, wherein the hotness tracker is further configured to increment the first temperature of the first portion of the data based at least on the request to access the first portion of the data.

Statement 10. An embodiment of the disclosure includes the storage device according to statement 8, wherein the hotness tracker is further configured to update the third temperature of the data based at least in part on the request to access the first portion of the data.

Statement 11. An embodiment of the disclosure includes the storage device according to statement 8, wherein the hotness tracker is further configured to increment the third temperature of the data based at least in part on the request to access the first portion of the data.

Statement 12. An embodiment of the disclosure includes the storage device according to statement 8, wherein the hotness tracker is further configured to send a request to the cache to cache the first portion of the data based at least in part on the request to access the first portion of the data.

Statement 13. An embodiment of the disclosure includes the storage device according to statement 12, wherein the hotness tracker is further configured to send the request to the cache to cache the first portion of the data based at least in part on the request to access the first portion of the data, the first temperature of the first portion of the data, and a threshold.

Statement 14. An embodiment of the disclosure includes the storage device according to statement 1, wherein the third temperature of the data includes an access rate for the data.

Statement 15. An embodiment of the disclosure includes the storage device according to statement 14, wherein:

the hotness tracker is further configured to track a last access time for the data;

the hotness tracker is further configured to compute the access rate for the data based at least in part on the first temperature of the first portion of the data, the second temperature of the second portion of the data, and the last access time for the data.

Statement 16. An embodiment of the disclosure includes the storage device according to statement 15, wherein:

the last access time for the data includes the last access time for the portion of the data;

the first temperature of the first portion of the data includes the last access time for the first portion of the data; and the second temperature of the second portion of the data includes a second last access time for the second portion of the data.

Statement 17. An embodiment of the disclosure includes the storage device according to statement 16, wherein:

the hotness tracker is further configured to compute the third temperature of the data based at least in part on the first temperature of the first portion of the data, the second temperature of the second portion of the data, the last access time for the first portion of the data, and the second last access time for the second portion of the data.

Statement 18. An embodiment of the disclosure includes the storage device according to statement 17, wherein:

the hotness tracker is further configured to compute a first access rate based at least in part on the first temperature of the first portion of the data and the last access time for the first portion of the data, to compute a second access rate based at least in part on the second temperature of the first portion of the data and the second last access time for the second portion of the data, and to compute the third temperature based at least in part on the first access rate and the second access rate.

Statement 19. An embodiment of the disclosure includes the storage device according to statement 16, wherein:

the first temperature of the first portion of the data further includes a first first access time for the first portion of the data; and the second temperature of the second portion of the data further includes a second first access time for the second portion of the data.

Statement 20. An embodiment of the disclosure includes the storage device according to statement 19, wherein:

the hotness tracker is further configured to compute the third temperature of the data based at least in part on the first temperature of the first portion of the data, the second temperature of the second portion of the data, the first first access time for the first portion of the data, the last access time for the first portion of the data, the second first access time for the second portion of the data, and the second last access time for the second portion of the data.

Statement 21. An embodiment of the disclosure includes the storage device according to statement 20, wherein:

the hotness tracker is further configured to compute a first access rate based at least in part on the first temperature of the first portion of the data, the first first access time for the first portion of the data, and the last access time for the first portion of the data, to compute a second access rate based at least in part on the second temperature of the first portion of the data, the second first access time for the second portion of the data, and the second last access time for the second portion of the data, and to compute the third temperature based at least in part on the first access rate and the second access rate.

Statement 22. An embodiment of the disclosure includes the storage device according to statement 1, further comprising a hot page list, wherein the hotness tracker is configured to update the hot page list based at least in part on the third temperature of the data.

Statement 23. An embodiment of the disclosure includes the storage device according to statement 22, further comprising a second storage medium to store the hot page list.

Statement 24. An embodiment of the disclosure includes the storage device according to statement 22, wherein the hotness tracker is configured to add an identifier of the data to the hot page list based at least in part on the third temperature of the data.

Statement 25. An embodiment of the disclosure includes the storage device according to statement 22, wherein the hotness tracker is configured to add the identifier of the data the data to the hot page list based at least in part on the third temperature of the data and a threshold.

Statement 26. An embodiment of the disclosure includes the storage device according to statement 22, wherein the hotness tracker is further configured to evict a victim page from the hot page list based at least in part on the third temperature of the data and a fourth temperature of the victim page.

Statement 27. An embodiment of the disclosure includes the storage device according to statement 22, wherein the storage device is configured to send the hot page list to a host processor.

Statement 28. An embodiment of the disclosure includes the storage device according to statement 27, wherein the storage device is further configured to receive a request for the hot page list from the host processor and to send the hot page list to the host processor based at least in part on the request from the host processor.

Statement 29. An embodiment of the disclosure includes the storage device according to statement 1, wherein the hotness tracker is configured to reset the third temperature of the data, the first temperature of the first portion of the data, and the second temperature of the second portion of the data.

Statement 30. An embodiment of the disclosure includes the storage device according to statement 29, wherein the hotness tracker is further configured to reset the third temperature of the data, the first temperature of the first portion of the data, and the second temperature of the second portion of the data based at least in part on a start of an epoch.

Statement 31. An embodiment of the disclosure includes the storage device according to statement 29, wherein the hotness tracker is further configured to reset the third temperature of the data, the first temperature of the first portion of the data, and the second temperature of the second portion of the data based at least on a request from a host processor.

Statement 32. An embodiment of the disclosure includes the storage device according to statement 1, wherein:

the first temperature of the first portion of the data includes a last access time for the first portion of the data; and the hotness tracker is further configured to determine a difference between the last access time for the first portion of the data and a current time and to reset the first temperature of the first portion of the data and the last access time for the first portion of the data based at least in part on the difference and a threshold.

Statement 33. An embodiment of the disclosure includes the storage device according to statement 32, wherein:

the first temperature of the first portion of the data further includes a first access time for the first portion of the data; and the hotness tracker is further configured to reset the first temperature of the first portion of the data, the first access time for the portion of the data, and the last access time for the first portion of the data based at least in part on the difference and the threshold.

Statement 34. An embodiment of the disclosure includes the storage device according to statement 1, wherein:

the hotness tracker is further configured to determine a difference between a last access time for the data and a current time and to reset the first temperature of the first portion of the data and the last access time for the data based at least in part on the difference and a threshold.

Statement 35. An embodiment of the disclosure includes the storage device according to statement 34, wherein:

the hotness tracker is further configured to reset the first temperature of the first portion of the data, the second temperature of the second portion of the data, and the last access time for the data based at least in part on the difference and the threshold.

Statement 36. An embodiment of the disclosure includes the storage device according to statement 1, wherein:

the hotness tracker implements a first algorithm to compute the third temperature of the data based at least in part on the first temperature of the first portion of the data and the second temperature of the second portion of the data and a second algorithm to compute the third temperature of the data based at least in part on the first temperature of the first portion of the data and the second temperature of the second portion of the data; and the hotness tracker includes a heuristic algorithm to select between the first algorithm and the second algorithm.

Statement 37. An embodiment of the disclosure includes a method, comprising:

receiving, at a storage device, a request to access a first portion of a data stored by the storage device, the data including the first portion and a second portion;

determining, by the storage device, a first temperature of the first portion of the data;

updating, by the storage device, the first temperature of the first portion of the data based at least in part on the request to access the first portion of the data;

determining, by the storage device, a second temperature of the second portion of the data;

determining, by the storage device, a third temperature of the data based at least in part on the first temperature of the first portion of the data and the second temperature of the second portion of the data; and updating, by the storage device, a hot page list to identify the data based at least in part on the third temperature of the data.

Statement 38. An embodiment of the disclosure includes the method according to statement 37, wherein:

the storage device includes a cache to store the first portion of the data in a cache block;

the data includes a page size;

the cache block includes a cache block size; and the cache block size is smaller than the page size.

Statement 39. An embodiment of the disclosure includes the method according to statement 37, wherein the storage device includes a Solid State Drive (SSD).

Statement 40. An embodiment of the disclosure includes the method according to statement 39, wherein the SSD includes a cache-coherent interconnect protocol SSD.

Statement 41. An embodiment of the disclosure includes the method according to statement 40, wherein the cache-coherent interconnect protocol SSD includes a Compute Express Link (CXL) SSD.

Statement 42. An embodiment of the disclosure includes the method according to statement 37, wherein updating, by the storage device, the first temperature of the first portion of the data based at least in part on the request to access the first portion of the data includes incrementing, by the storage device, the first temperature of the first portion of the data based at least in part on the request to access the first portion of the data.

Statement 43. An embodiment of the disclosure includes the method according to statement 37, wherein updating, by the storage device, the first temperature of the first portion of the data based at least in part on the request to access the first portion of the data includes setting a last access time for the first portion of the data.

Statement 44. An embodiment of the disclosure includes the method according to statement 43, wherein updating, by the storage device, the first temperature of the first portion of the data based at least in part on the request to access the first portion of the data further includes setting a first access time for the first portion of the data.

Statement 45. An embodiment of the disclosure includes the method according to statement 37, wherein determining, by the storage device, the third temperature of the data based at least in part on the first temperature of the first portion of the data and the second temperature of the second portion of the data includes updating, by the storage device, the third temperature of the data based at least in part on the first temperature of the first portion of the data.

Statement 46. An embodiment of the disclosure includes the method according to statement 45, wherein updating, by the storage device, the third temperature of the data based at least in part on the first temperature of the first portion of the data includes incrementing, by the storage device, the third temperature of the data based at least in part on the first temperature of the first portion of the data.

Statement 47. An embodiment of the disclosure includes the method according to statement 37, wherein determining, by the storage device, the third temperature of the data based at least in part on the first temperature of the first portion of the data and the second temperature of the second portion of the data includes determining, by the storage device, the third temperature of the data based at least in part on the first temperature of the first portion of the data, the second temperature of the second portion of the data, and a last access time for the data.

Statement 48. An embodiment of the disclosure includes the method according to statement 47, wherein:

the last access time for the data includes the last access time for the portion of the data;

the first temperature of the first portion of the data includes the last access time for the first portion of the data; and the second temperature of the second portion of the data includes a second last access time for the second portion of the data; and determining, by the storage device, the third temperature of the data based at least in part on the first temperature of the first portion of the data, the second temperature of the second portion of the data, and the last access time for the data includes:

determining a first access rate for the first portion of the data based at least in part on the first temperature of the first portion of the data and the last access time for the first portion of the data;

determining a second access rate for the second portion of the data based at least in part on the second temperature of the second portion of the data and second the last access time for the second portion of the data; and determining the third temperature of the data based at least in part on the first access rate and the second access rate.

Statement 49. An embodiment of the disclosure includes the method according to statement 48, wherein:

the first temperature of the first portion of the data further includes a first first access time for the first portion of the data; and the second temperature of the second portion of the data further includes a second first access time for the second portion of the data;

determining the first access rate for the first portion of the data based at least in part on the first temperature of the first portion of the data and the last access time for the first portion of the data includes determining the first access rate for the first portion of the data based at least in part on the first temperature of the first portion of the data, the first first access time for the first portion of the data, and the last access time for the first portion of the data; and determining the second access rate for the second portion of the data based at least in part on the second temperature of the second portion of the data and second the last access time for the second portion of the data includes determining the second access rate for the second portion of the data based at least in part on the second temperature of the second portion of the data, the second first access time for the second portion of the data, and second the last access time for the second portion of the data.

Statement 50. An embodiment of the disclosure includes the method according to statement 37, further comprising sending, by the storage device, a second request to a cache of the storage device to cache the first portion of the data in a cache block in the cache of the storage device based at least in part on the request to access the first portion of the data.

Statement 51. An embodiment of the disclosure includes the method according to statement 50, wherein sending, by the storage device, the second request to the cache of the storage device to cache the first portion of the data in the cache block in the cache of the storage device based at least in part on the request to access the first portion of the data includes sending, by the storage device, the second request to the cache of the storage device to cache the first portion of the data in the cache block in the cache of the storage device based at least in part on the request to access the first portion of the data and a threshold.

Statement 52. An embodiment of the disclosure includes the method according to statement 37, wherein updating, by the storage device, the hot page list to identify the data based at least in part on the first temperature of the first portion of the data includes updating, by the storage device, the hot page list to identify the data based at least in part on the first temperature of the first portion of the data and a threshold.

Statement 53. An embodiment of the disclosure includes the method according to statement 52, wherein updating, by the storage device, the hot page list to identify the data based at least in part on the first temperature of the first portion of the data includes evicting a victim page from the hot page list.

Statement 54. An embodiment of the disclosure includes the method according to statement 53, wherein updating, by the storage device, the hot page list to identify the data based at least in part on the first temperature of the first portion of the data further includes selecting the victim page from the hot page list.

Statement 55. An embodiment of the disclosure includes the method according to statement 53, wherein evicting the victim page from the hot page list includes evicting the victim page from the hot page list based at least in part on the third temperature of the data and a fourth temperature of the victim page.

Statement 56. An embodiment of the disclosure includes the method according to statement 37, further comprising sending, from the storage device to a host processor, the hot page list.

Statement 57. An embodiment of the disclosure includes the method according to statement 56, wherein:

the method further comprises receiving, at the storage device from the host processor, a second request for the hot page list; and sending, from the storage device to the host processor, the hot page list includes sending, from the storage device to the host processor, the hot page list based at least in part on the second request.

Statement 58. An embodiment of the disclosure includes the method according to statement 37, further comprising resetting, by the storage device, the first temperature of the first portion of the data, the second temperature of the second portion of the data, and the third temperature of the data.

Statement 59. An embodiment of the disclosure includes the method according to statement 58, wherein resetting, by the storage device, the first temperature of the first portion of the data, the second temperature of the second portion of the data, and the third temperature of the data includes resetting, by the storage device, the first temperature of the first portion of the data, the second temperature of the second portion of the data, and the third temperature of the data based at least in part on a start of an epoch.

Statement 60. An embodiment of the disclosure includes the method according to statement 58, wherein:

the method further comprises receiving, at the storage device from a host processor, a second request to reset the first temperature of the first portion of the data, the second temperature of the second portion of the data, and the third temperature of the data; and resetting, by the storage device, the first temperature of the first portion of the data, the second temperature of the second portion of the data, and the third temperature of the data includes resetting, by the storage device, the first temperature of the first portion of the data, the second temperature of the second portion of the data, and the third temperature of the data based at least in part on the second request.

Statement 61. An embodiment of the disclosure includes the method according to statement 37, wherein:

the first temperature of the first portion of the data includes a last access time for the first portion of the data; and the method further comprises:

determining a difference between the last access time for the first portion of the data; and resetting the first temperature of the first portion of the data and the last access time for the first portion of the data based at least in part on the difference and a threshold.

Statement 62. An embodiment of the disclosure includes the method according to statement 61, wherein:

the first temperature of the first portion of the data further includes a first access time for the first portion of the data; and resetting the first temperature of the first portion of the data and the last access time for the first portion of the data based at least in part on the difference and the threshold includes resetting the first temperature of the first portion of the data, the first access time for the first portion of the data, and the last access time for the first portion of the data based at least in part on the difference and the threshold.

Statement 63. An embodiment of the disclosure includes the method according to statement 37, further comprising:

determining a difference between a last access time for the data and a current time; and resetting the first temperature of the first portion of the data and the last access time for the data based at least in part on the difference and a threshold.

Statement 64. An embodiment of the disclosure includes the method according to statement 63, wherein:

resetting the first temperature of the first portion of the data and the last access time for the data based at least in part on the difference and a threshold includes resetting the first temperature of the first portion of the data, the second temperature of the second portion of the data, and the last access time for the data based at least in part on the difference and the threshold.

Statement 65. An embodiment of the disclosure includes the method according to statement 37, wherein:

the storage device implements a first algorithm to determine the third temperature of the data based at least in part on the first temperature of the first portion of the data and the second temperature of the second portion of the data and a second algorithm to determine the third temperature of the data based at least in part on the first temperature of the first portion of the data and the second temperature of the second portion of the data; and the hotness tracker includes a heuristic algorithm to select between the first algorithm and the second algorithm.

Statement 66. An embodiment of the disclosure includes a system, comprising a non-transitory storage medium, the non-transitory storage medium having stored thereon instructions that, when executed by a machine, result in:

receiving, at a storage device, a request to access a first portion of a data stored by the storage device, the data including the first portion and a second portion;

determining, by the storage device, a first temperature of the first portion of the data;

updating, by the storage device, the first temperature of the first portion of the data based at least in part on the request to access the first portion of the data;

determining, by the storage device, a second temperature of the second portion of the data;

determining, by the storage device, a third temperature of the data based at least in part on the first temperature of the first portion of the data and the second temperature of the second portion of the data; and updating, by the storage device, a hot page list to identify the data based at least in part on the third temperature of the data.

Statement 67. An embodiment of the disclosure includes the system according to statement 66, wherein:

the storage device includes a cache to store the first portion of the data in a cache block;

the data includes a page size;

the cache block includes a cache block size; and the cache block size is smaller than the page size.

Statement 68. An embodiment of the disclosure includes the system according to statement 66, wherein the storage device includes a Solid State Drive (SSD).

Statement 69. An embodiment of the disclosure includes the system according to statement 68, wherein the SSD includes a cache-coherent interconnect protocol SSD.

Statement 70. An embodiment of the disclosure includes the system according to statement 69, wherein the cache-coherent interconnect protocol SSD includes a Compute Express Link (CXL) SSD.

Statement 71. An embodiment of the disclosure includes the system according to statement 66, wherein updating, by the storage device, the first temperature of the first portion of the data based at least in part on the request to access the first portion of the data includes incrementing, by the storage device, the first temperature of the first portion of the data based at least in part on the request to access the first portion of the data.

Statement 72. An embodiment of the disclosure includes the system according to statement 66, wherein updating, by the storage device, the first temperature of the first portion of the data based at least in part on the request to access the first portion of the data includes setting a last access time for the first portion of the data.

Statement 73. An embodiment of the disclosure includes the system according to statement 72, wherein updating, by the storage device, the first temperature of the first portion of the data based at least in part on the request to access the first portion of the data further includes setting a first access time for the first portion of the data.

Statement 74. An embodiment of the disclosure includes the system according to statement 66, wherein determining, by the storage device, the third temperature of the data based at least in part on the first temperature of the first portion of the data and the second temperature of the second portion of the data includes updating, by the storage device, the third temperature of the data based at least in part on the first temperature of the first portion of the data.

Statement 75. An embodiment of the disclosure includes the system according to statement 74, wherein updating, by the storage device, the third temperature of the data based at least in part on the first temperature of the first portion of the data includes incrementing, by the storage device, the third temperature of the data based at least in part on the first temperature of the first portion of the data.

Statement 76. An embodiment of the disclosure includes the system according to statement 66, wherein determining, by the storage device, the third temperature of the data based at least in part on the first temperature of the first portion of the data and the second temperature of the second portion of the data includes determining, by the storage device, the third temperature of the data based at least in part on the first temperature of the first portion of the data, the second temperature of the second portion of the data, and a last access time for the data.

Statement 77. An embodiment of the disclosure includes the system according to statement 76, wherein:
the last access time for the data includes the last access time for the portion of the data;
the first temperature of the first portion of the data includes the last access time for the first portion of the data; and
the second temperature of the second portion of the data includes a second last access time for the second portion of the data; and
determining, by the storage device, the third temperature of the data based at least in part on the first temperature of the first portion of the data, the second temperature of the second portion of the data, and the last access time for the data includes:
determining a first access rate for the first portion of the data based at least in part on the first temperature of the first portion of the data and the last access time for the first portion of the data;
determining a second access rate for the second portion of the data based at least in part on the second temperature of the second portion of the data and second the last access time for the second portion of the data; and
determining the third temperature of the data based at least in part on the first access rate and the second access rate.

Statement 78. An embodiment of the disclosure includes the system according to statement 77, wherein:
the first temperature of the first portion of the data further includes a first first access time for the first portion of the data; and
the second temperature of the second portion of the data further includes a second first access time for the second portion of the data;
determining the first access rate for the first portion of the data based at least in part on the first temperature of the first portion of the data and the last access time for the first portion of the data includes determining the first access rate for the first portion of the data based at least in part on the first temperature of the first portion of the data, the first first access time for the first portion of the data, and the last access time for the first portion of the data; and
determining the second access rate for the second portion of the data based at least in part on the second temperature of the second portion of the data and second the last access time for the second portion of the data includes determining the second access rate for the second portion of the data based at least in part on the second temperature of the second portion of the data, the second first access time for the second portion of the data, and second the last access time for the second portion of the data.

Statement 79. An embodiment of the disclosure includes the system according to statement 66, the non-transitory storage medium having stored thereon further instructions that, when executed by the machine, result in sending, by the storage device, a second request to a cache of the storage device to cache the first portion of the data in a cache block in the cache of the storage device based at least in part on the request to access the first portion of the data.

Statement 80. An embodiment of the disclosure includes the system according to statement 79, wherein sending, by the storage device, the second request to the cache of the storage device to cache the first portion of the data in the cache block in the cache of the storage device based at least in part on the request to access the first portion of the data includes sending, by the storage device, the second request to the cache of the storage device to cache the first portion of the data in the cache block in the cache of the storage device based at least in part on the request to access the first portion of the data and a threshold.

Statement 81. An embodiment of the disclosure includes the system according to statement 66, wherein updating, by the storage device, the hot page list to identify the data based at least in part on the first temperature of the first portion of the data includes updating, by the storage device, the hot page list to identify the data based at least in part on the first temperature of the first portion of the data and a threshold.

Statement 82. An embodiment of the disclosure includes the system according to statement 81, wherein updating, by the storage device, the hot page list to identify the data based at least in part on the first temperature of the first portion of the data includes evicting a victim page from the hot page list.

Statement 83. An embodiment of the disclosure includes the system according to statement 82, wherein updating, by the storage device, the hot page list to identify the data based at least in part on the first temperature of the first portion of the data further includes selecting the victim page from the hot page list.

Statement 84. An embodiment of the disclosure includes the system according to statement 82, wherein evicting the victim page from the hot page list includes evicting the victim page from the hot page list based at least in part on the third temperature of the data and a fourth temperature of the victim page.

Statement 85. An embodiment of the disclosure includes the system according to statement 66, the non-transitory storage medium having stored thereon further instructions that, when executed by the machine, result in sending, from the storage device to a host processor, the hot page list.

Statement 86. An embodiment of the disclosure includes the system according to statement 85, wherein:

the non-transitory storage medium has stored thereon further instructions that, when executed by the machine, result in receiving, at the storage device from the host processor, a second request for the hot page list; and sending, from the storage device to the host processor, the hot page list includes sending, from the storage device to the host processor, the hot page list based at least in part on the second request.

Statement 87. An embodiment of the disclosure includes the system according to statement 66, the non-transitory storage medium having stored thereon further instructions that, when executed by the machine, result in resetting, by the storage device, the first temperature of the first portion of the data, the second temperature of the second portion of the data, and the third temperature of the data.

Statement 88. An embodiment of the disclosure includes the system according to statement 87, wherein resetting, by the storage device, the first temperature of the first portion of the data, the second temperature of the second portion of the data, and the third temperature of the data includes resetting, by the storage device, the first temperature of the first portion of the data, the second temperature of the second portion of the data, and the third temperature of the data based at least in part on a start of an epoch.

Statement 89. An embodiment of the disclosure includes the system according to statement 87, wherein:

the non-transitory storage medium has stored thereon further instructions that, when executed by the machine, result in receiving, at the storage device from a host processor, a second request to reset the first temperature of the first portion of the data, the second temperature of the second portion of the data, and the third temperature of the data; and resetting, by the storage device, the first temperature of the first portion of the data, the second temperature of the second portion of the data, and the third temperature of the data includes resetting, by the storage device, the first temperature of the first portion of the data, the second temperature of the second portion of the data, and the third temperature of the data based at least in part on the second request.

Statement 90. An embodiment of the disclosure includes the system according to statement 66, wherein:

the first temperature of the first portion of the data includes a last access time for the first portion of the data; and the non-transitory storage medium has stored thereon further instructions that, when executed by the machine, result in:

determining a difference between the last access time for the first portion of the data; and resetting the first temperature of the first portion of the data and the last access time for the first portion of the data based at least in part on the difference and a threshold.

Statement 91. An embodiment of the disclosure includes the system according to statement 90, wherein:

the first temperature of the first portion of the data further includes a first access time for the first portion of the data; and resetting the first temperature of the first portion of the data and the last access time for the first portion of the data based at least in part on the difference and the threshold includes resetting the first temperature of the first portion of the data, the first access time for the first portion of the data, and the last access time for the first portion of the data based at least in part on the difference and the threshold.

Statement 92. An embodiment of the disclosure includes the system according to statement 66, the non-transitory storage medium having stored thereon further instructions that, when executed by the machine, result in:

determining a difference between a last access time for the data and a current time; and resetting the first temperature of the first portion of the data and the last access time for the data based at least in part on the difference and a threshold.

Statement 93. An embodiment of the disclosure includes the system according to statement 92, wherein:

resetting the first temperature of the first portion of the data and the last access time for the data based at least in part on the difference and a threshold includes resetting the first temperature of the first portion of the data, the second temperature of the second portion of the data, and the last access time for the data based at least in part on the difference and the threshold.

Statement 94. An embodiment of the disclosure includes the system according to statement 66, wherein:

the storage device implements a first algorithm to determine the third temperature of the data based at least in part on the first temperature of the first portion of the data and the second temperature of the second portion of the data and a second algorithm to determine the third temperature of the data based at least in part on the first temperature of the first portion of the data and the second temperature of the second portion of the data; and the hotness tracker includes a heuristic algorithm to select between the first algorithm and the second algorithm.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A storage device, comprising:

a storage medium to store a data, the data including a first portion and a second portion;

a cache to store the first portion of the data in a first cache block;

a controller to access the data from the storage medium or the cache; and a hotness tracker to track a first temperature of the first portion of the data and a second temperature of the second portion of the data and to compute a third temperature of the data based at least in part on the first temperature of the first portion of the data and the second temperature of the second portion of the data.

2. The storage device according to claim 1, further comprising a second storage medium to store the first temperature of the first portion of the data and the second temperature of the second portion of the data.

3. The storage device according to claim 1, further comprising a second storage medium to store the third temperature of the data based at least in part on the first temperature of the first portion of the data and the second temperature of the second portion of the data.

4. The storage device according to claim 1, further comprising a second storage medium to store a hot page list.

5. The storage device according to claim 1, wherein:

the third temperature of the data includes an access rate for the data;

the hotness tracker is further configured to track a last access time for the data;

the hotness tracker is further configured to compute the access rate for the data based at least in part on the first temperature of the first portion of the data, the second temperature of the second portion of the data, and the last access time for the data.

6. A method, comprising:

receiving, at a storage device, a request to access a first portion of a data stored by the storage device, the data including the first portion and a second portion;

determining, by the storage device, a first temperature of the first portion of the data;

updating, by the storage device, the first temperature of the first portion of the data based at least in part on the request to access the first portion of the data;

determining, by the storage device, a second temperature of the second portion of the data;

determining, by the storage device, a third temperature of the data based at least in part on the first temperature of the first portion of the data and the second temperature of the second portion of the data; and updating, by the storage device, a hot page list to identify the data based at least in part on the third temperature of the data.

7. The method according to claim 6, wherein determining, by the storage device, a third temperature of the data based at least in part on the first temperature of the first portion of the data and the second temperature of the second portion of the data includes updating, by the storage device, the third temperature of the data based at least in part on the first temperature of the first portion of the data.

8. The method according to claim 6, further comprising sending, by the storage device, a second request to a cache of the storage device to cache the first portion of the data in a cache block in the cache of the storage device based at least in part on the request to access the first portion of the data and a threshold.

9. The method according to claim 6, wherein updating, by the storage device, the hot page list to identify the data based at least in part on the first temperature of the first portion of the data includes updating, by the storage device, the hot page list to identify the data based at least in part on the first temperature of the first portion of the data and a threshold.

10. The method according to claim 9, wherein updating, by the storage device, the hot page list to identify the data based at least in part on the first temperature of the first portion of the data includes evicting a victim page from the hot page list.

11. The method according to claim 10, wherein updating, by the storage device, the hot page list to identify the data based at least in part on the first temperature of the first portion of the data further includes selecting the victim page from the hot page list.

12. The method according to claim 10, wherein evicting the victim page from the hot page list includes evicting the victim page from the hot page list based at least in part on the third temperature of the data and a fourth temperature of the victim page.

13. The method according to claim 6, further comprising sending, from the storage device to a host processor, the hot page list.

14. The method according to claim 13, wherein:

the method further comprises receiving, at the storage device from the host processor, a second request for the hot page list; and sending, from the storage device to the host processor, the hot page list includes sending, from the storage device to the host processor, the hot page list based at least in part on the second request.

15. The method according to claim 6, further comprising actively resetting, by the storage device, the first temperature of the first portion of the data, the second temperature of the second portion of the data, and the third temperature of the data.

16. The method according to claim 15, wherein actively resetting, by the storage device, the first temperature of the first portion of the data, the second temperature of the second portion of the data, and the third temperature of the data includes resetting, by the storage device, the first temperature of the first portion of the data, the second temperature of the second portion of the data, and the third temperature of the data based at least in part on a start of an epoch.

17. The method according to claim 15, wherein:

the method further comprises receiving, at the storage device from a host processor, a second request to reset the first temperature of the first portion of the data, the second temperature of the second portion of the data, and the third temperature of the data; and actively resetting, by the storage device, the first temperature of the first portion of the data, the second temperature of the second portion of the data, and the third temperature of the data includes resetting, by the storage device, the first temperature of the first portion of the data, the second temperature of the second portion of the data, and the third temperature of the data based at least in part on the second request.

18. The method according to claim 6, wherein determining, by the storage device, the third temperature of the data based at least in part on the first temperature of the first portion of the data and the second temperature of the second portion of the data includes determining, by the storage device, the third temperature of the data based at least in part on the first temperature of the first portion of the data, the second temperature of the second portion of the data, and a last access time for the data.

19. A system, comprising a non-transitory storage medium, the non-transitory storage medium having stored thereon instructions that, when executed by a machine, result in:

receiving, at a storage device, a request to access a first portion of a data stored by the storage device, the data including the first portion and a second portion;

determining, by the storage device, a first temperature of the first portion of the data;

updating, by the storage device, the first temperature of the first portion of the data based at least in part on the request to access the first portion of the data;

determining, by the storage device, a second temperature of the second portion of the data;

determining, by the storage device, a third temperature of the data based at least in part on the first temperature of the first portion of the data and the second temperature of the second portion of the data; and updating, by the storage device, a hot page list to identify the data based at least in part on the third temperature of the data.

20. The system according to claim 19, the non-transitory storage medium having stored thereon further instructions that, when executed by the machine, result in sending, from the storage device to a host processor, the hot page list.

21. The storage device according to claim 1, wherein the first portion of the data stored first cache block is smaller than an access size of the storage device.

22. The method according to claim 6, wherein the hot page list is provided to a host processor to enable the host processor to move the data from the storage device to a second storage device.

\* \* \* \* \*